Figure 4:
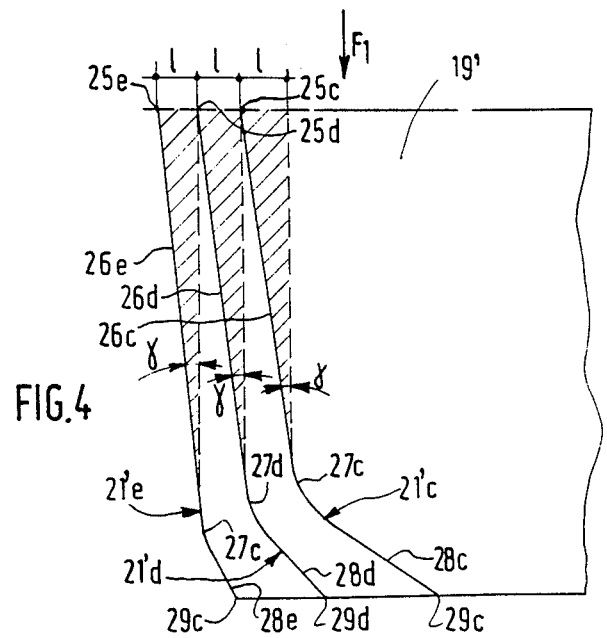

United States Patent [19]

Grataloup et al.

[11] Patent Number: 4,934,606
[45] Date of Patent: Jun. 19, 1990

[54] SPREADER FOR GRANULATED PRODUCTS BY FORCED PROJECTION

[75] Inventors: Xavier Grataloup; Denis Baret, both of Montereau, France

[73] Assignee: Nodet-Gougis, Montereau, France

[21] Appl. No.: 118,329

[22] Filed: Nov. 5, 1987

[30] Foreign Application Priority Data

Nov. 5, 1986 [FR] France ................. 86 15424

[51] Int. Cl.⁵ .......................................... A01C 17/00
[52] U.S. Cl. ................................. 239/664; 239/689; 222/281
[58] Field of Search ............... 239/664, 670, 652, 689; 222/281, 410, 414

[56] References Cited

U.S. PATENT DOCUMENTS

| 213,509 | 3/1879 | Hull ................................ 222/281 |
| 3,077,351 | 2/1963 | Van der Lely et al. ............. 239/664 |
| 3,615,056 | 10/1971 | Weiss ............................. 239/681 X |
| 3,670,696 | 6/1972 | Findley et al. ................. 222/281 X |

FOREIGN PATENT DOCUMENTS 968145  5/1975  Canada .............................. 239/664
1473211 5/1970  Fed. Rep. of Germany .

Primary Examiner—Andres Kashnikow
Assistant Examiner—Kevin Weldon
Attorney, Agent, or Firm—Bierman and Muserlian

[57] ABSTRACT

The spreader comprises at least one caster group (10) including at least two cylindrical rollers (11, 13) which are externally tangent to one another and define between them a spout (15, 16) for projecting the sheet of granular products flowing from a hopper (1). After being speeded-up and forcibly projected between the two rollers (11, 13), the projected sheet is taken-up a distribution device, with horizontal" (15) or vertical deflector, or with clusters of distribution tubes. Each caster group may comprises injection means, with at least two rollers which are externally tangent to one another to increase the flow of projected products.

38 Claims, 15 Drawing Sheets

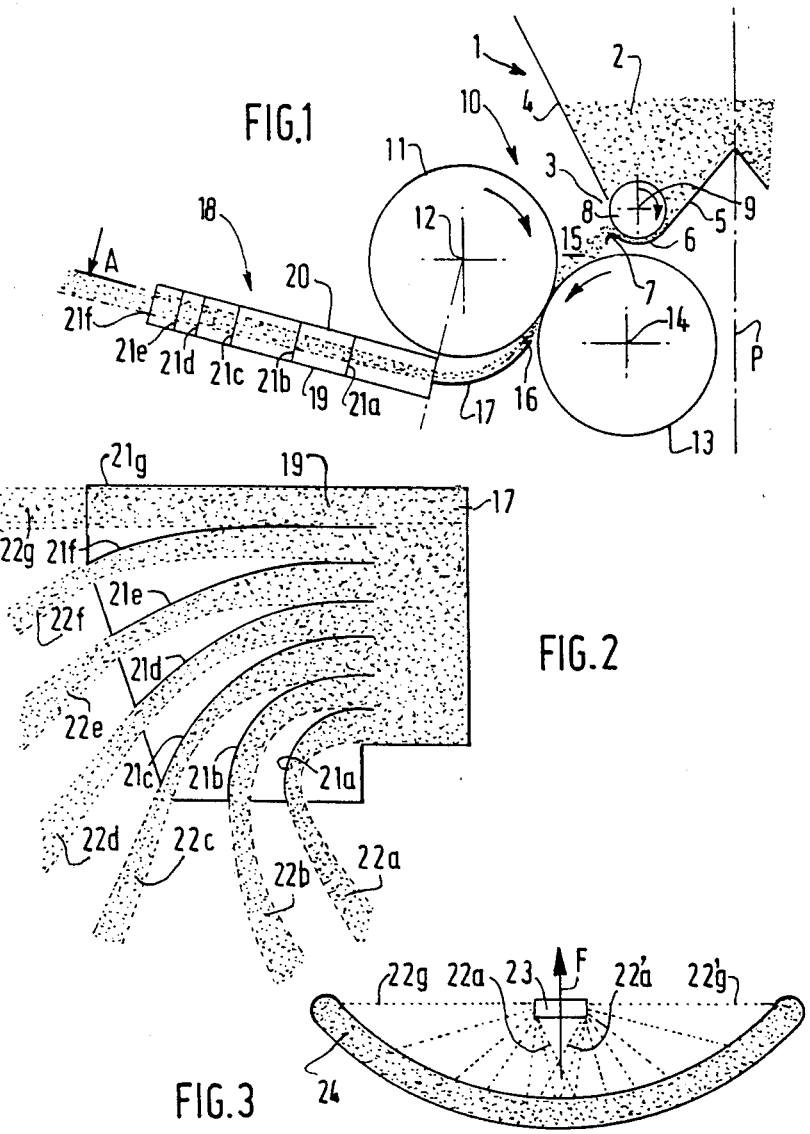

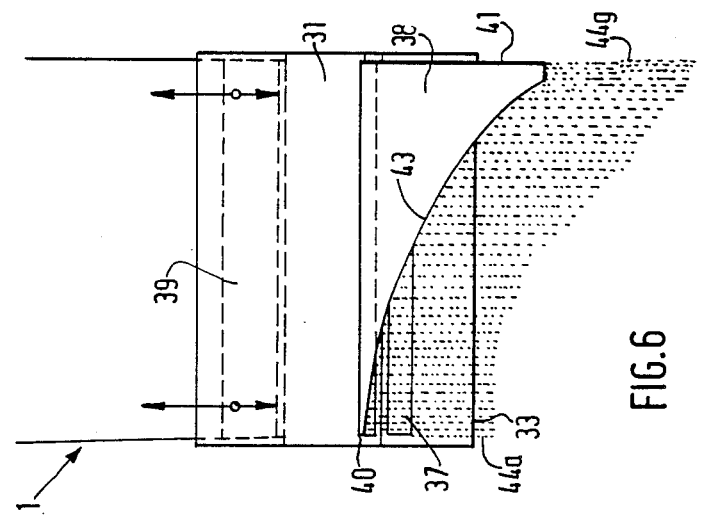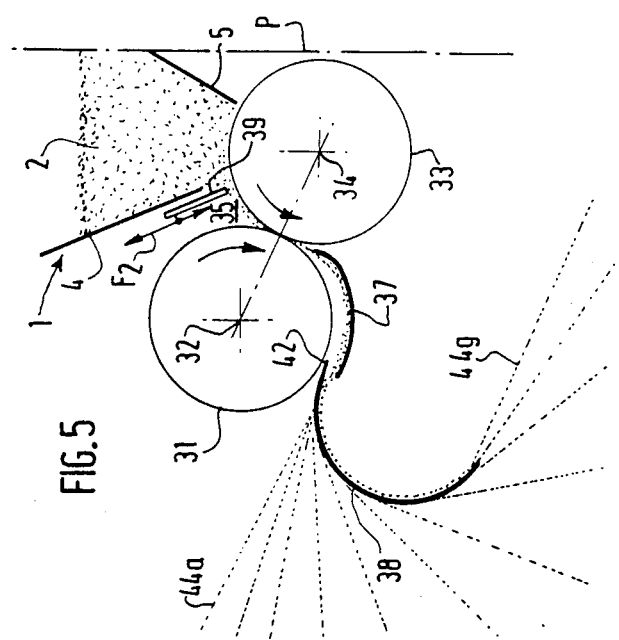

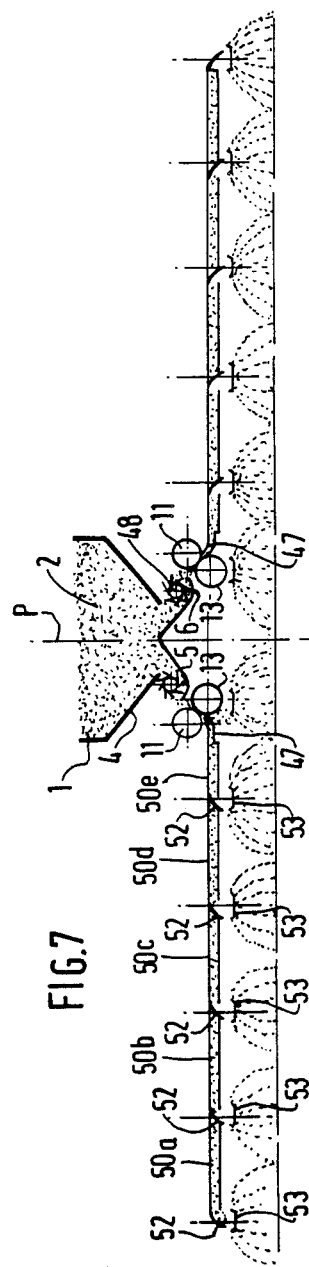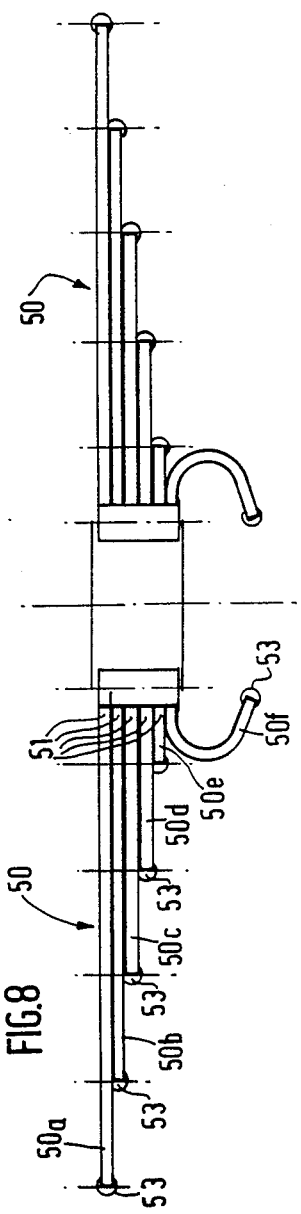

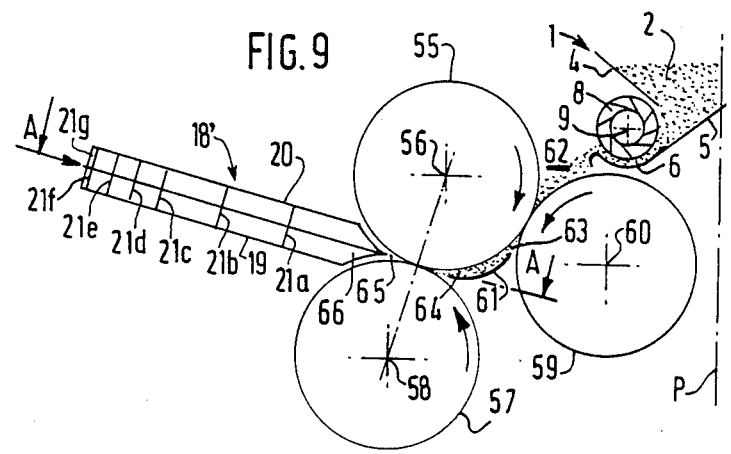
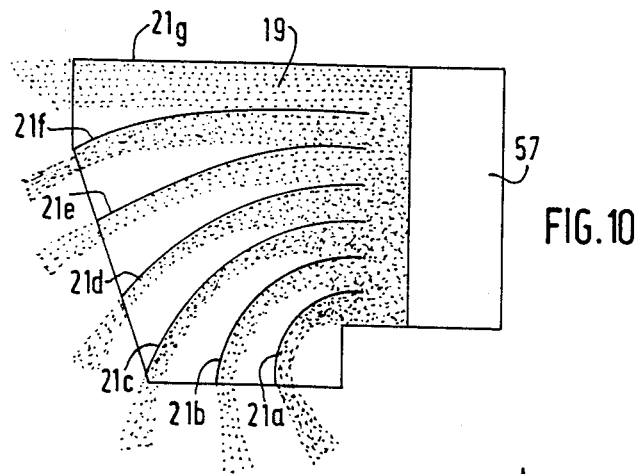
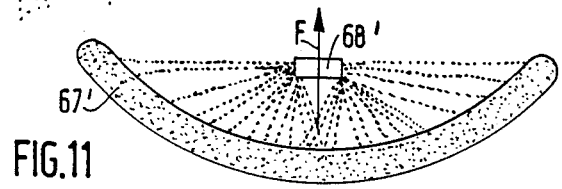

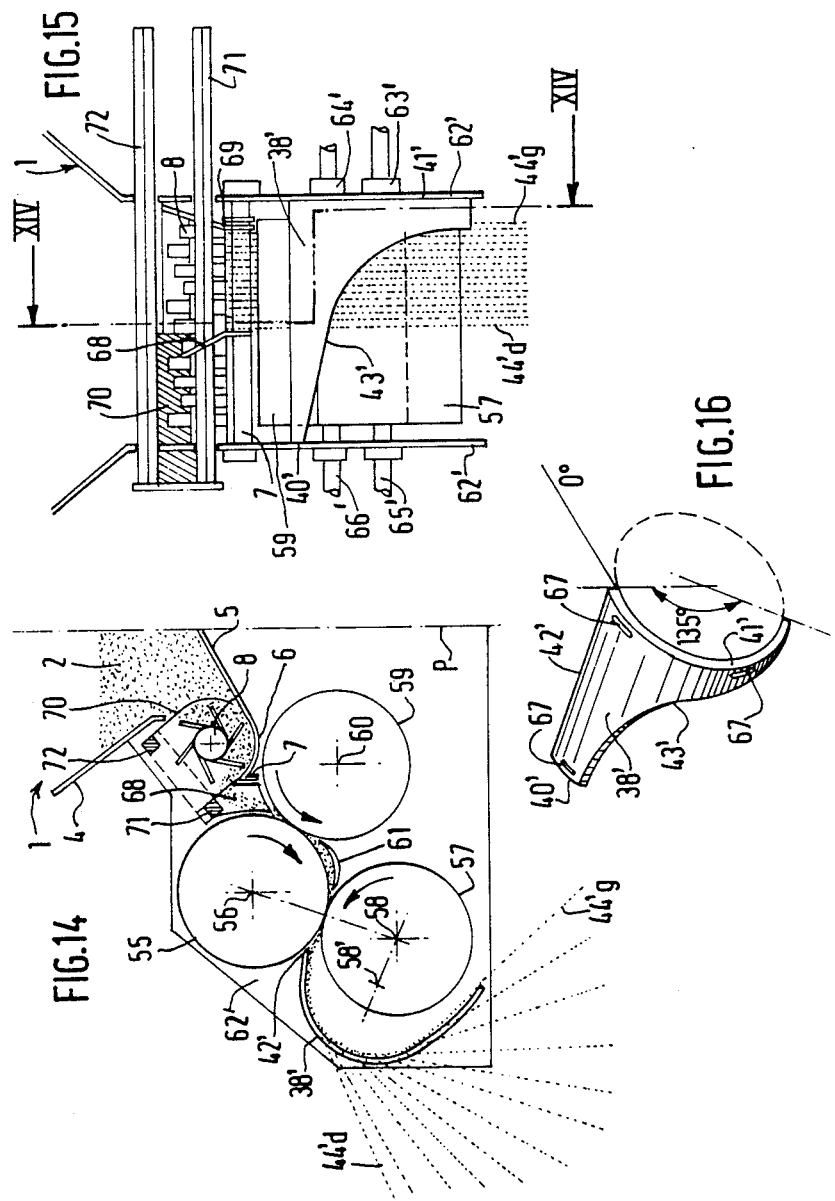

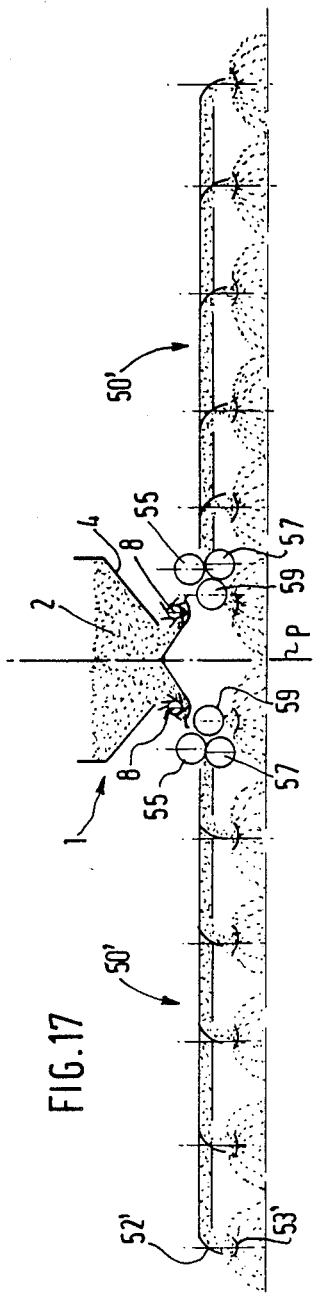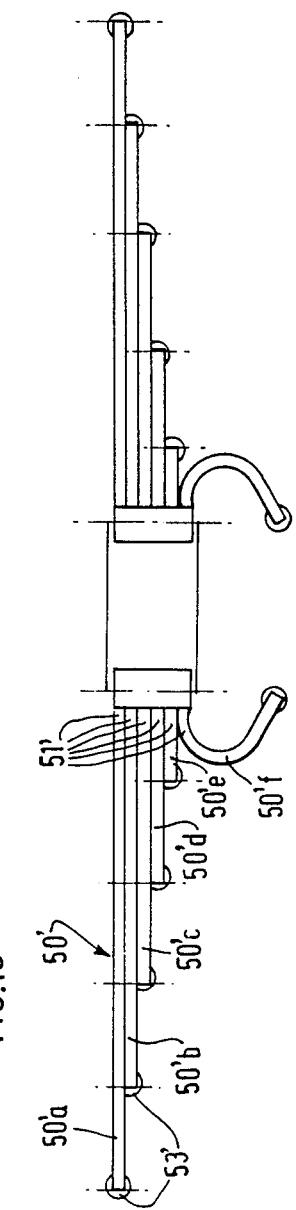

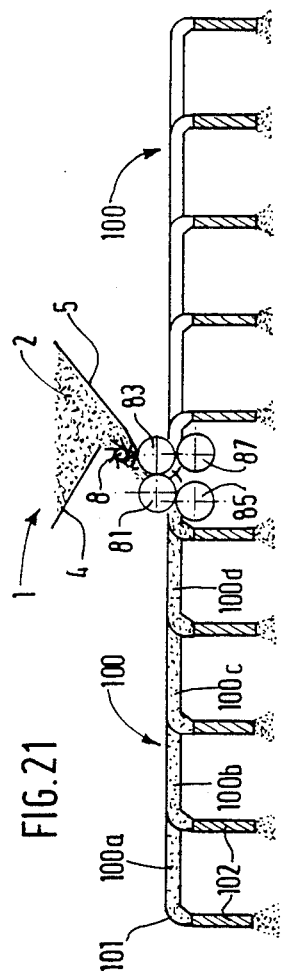
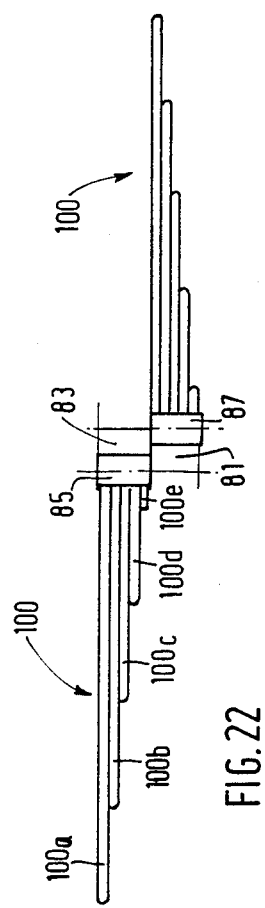
FIG.21
FIG.22

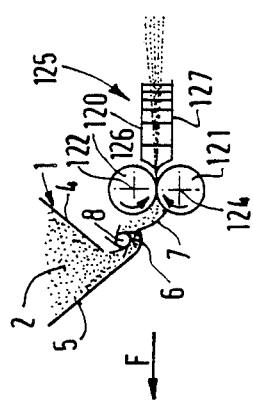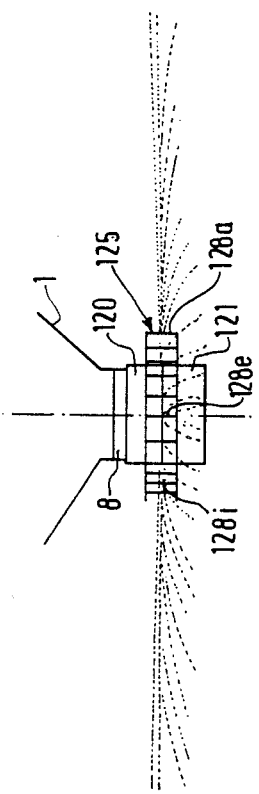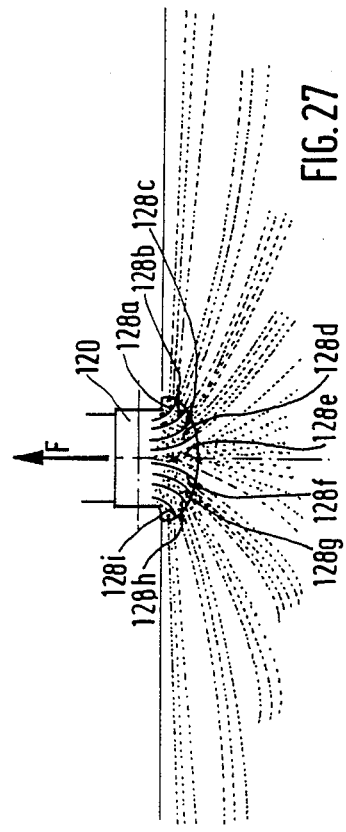

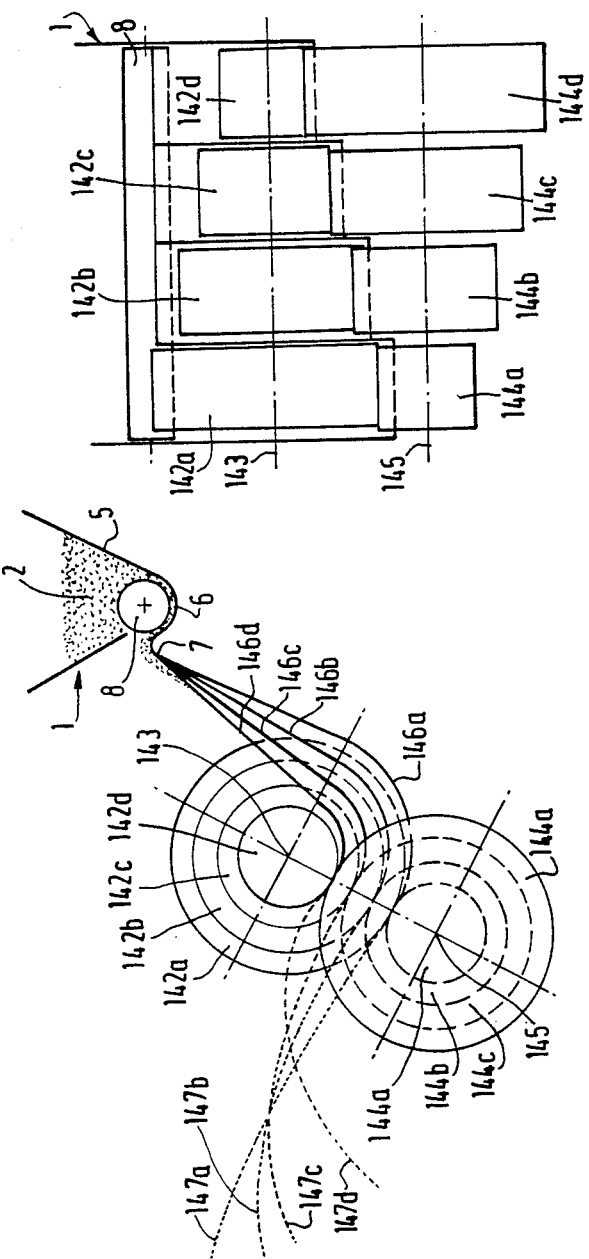

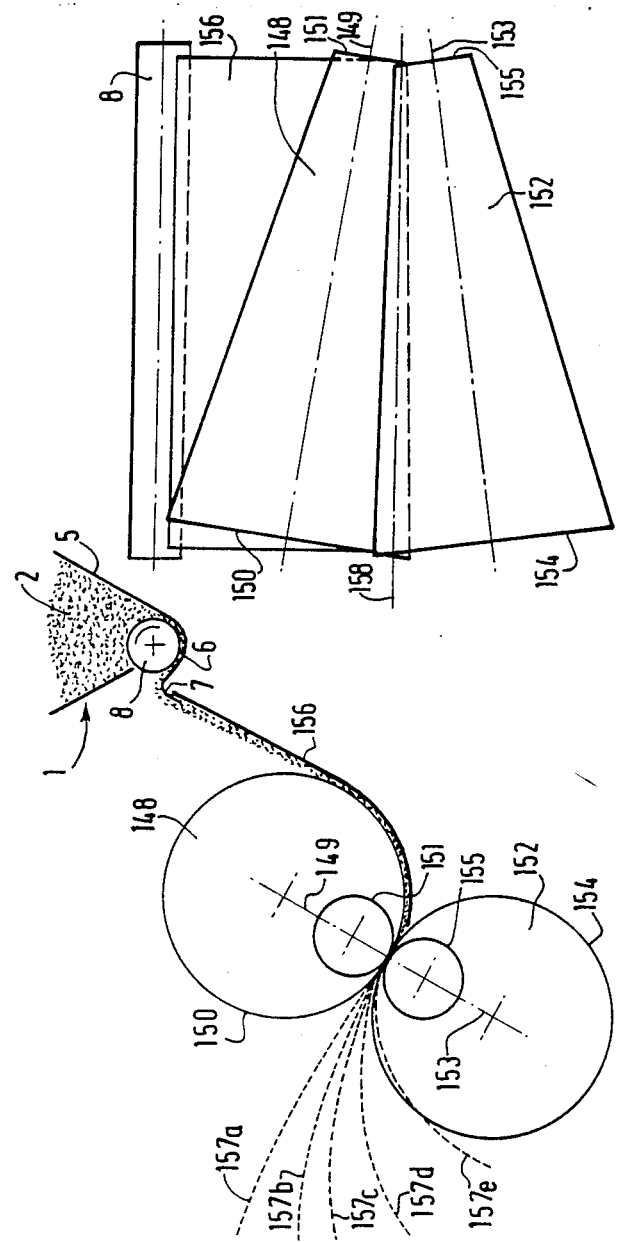

SPREADER FOR GRANULATED PRODUCTS BY FORCED PROJECTION.

The present invention refers to an agricutural spreading device, also called spreader in the present specification, which is meant for spreading by forced projection of products in grains of granules for the treatment of soils, such as fertilisers, weed killers, insecticides, and which may also be used to sow small size seeds, in a broadcast sowing method.

To carry out such spreadings by forced projection spreaders have already been proposed comprising:

a carrying chassis on which is mounted at least one component for transmitting a rotation motion which is meant to be coupled to a motor, a hopper, mounted on the chassis and intended to contain a load of granulated products able to flow through at least one opening at the base of the hopper, means of driving at speed and of forced projection of the granulated products, which are carried by the chassis and supplied with granulated products from at least one opening at the bottom of the hopper, and means of distributing projecting granulated products, the said means of distribution being also carried by the chassis, and in which the means of driving at speed and of forced projection are arranged in at least one casting set, comprising a first roller mounted in rotation on the chassis round its substantially fixed axis and the outer lateral surface of which forms a first mobile endless surface delimiting, together with a second mobile endless surface, a projection spout having an inlet and an outlet which have a crossing section progressively decreasing and increasing, one at least of the endless surfaces being positively driven from the said transmission component and forming a driving surface, which drives the granulated products introduced into the intake of the projection spout to the outlet of the latter, so that these granulated products are impelled, between the two mobile endless surfaces, with a linear speed which ensures their projection out of the spout.

In the spreader of the above-mentioned type proposed in the patent of the U.S. Pat. No. 3,746,264, the first roller is cylindrical and its axis is substantially horizontal, the means of distribution receive the granulated products projected out of the projection spout, and the second endless surface is defined by the outer lateral surface of an endless belt, in the lower position, passing over a rear pulley coupled to driving means, and of a front pulley which is a simple return pulely, and the endless belt cooperates with the cylindrical roller in the upper position, acting as a tensioning roller applied against the upper driving side of the belt, between the front and rear pulleys. The position of the axis of rotation of the pulleys as well as the inclination of the said axes in relation to the axis of rotation of the cylindrical roller are adjustable, in order to ensure a good tensioning of the endless belt and a suitable orientation of its direction of motion. The means of supply with material to be projected from the spout delimited between the roller and the endless belt can be a conveyor belt or chain or yet a volumetric delivery device for example a worm screw. Moreover, the bearing blocks in which the front pulley is mounted in rotation are secured on a support which is mounted inself pivoting around a shaft on the chassis, so that the position of the axis of rotation of the front pulley is adjustable over the arc of a circle, in order to adjust the angle of the tangent to the belt in relation to the horizontal, at the level of the point of casting of the projected materail. The adjustment of this angle, therefore, constitutes a first adjustment of the tranjectory in a vertical plane, this adjustment affecting the distance to which the material is projected as well as the spectrum of distribution of the granulated products. The adjustments of this angle can be ensured manually or by means of remotely controlled hydraulic means. On the other hand, the means of spreading consist in a fixed deflector ensuring the division of the outflow into serveral streams distributed or spread in a vertical plane by means of a plurality of deflecting fingers, into elongated rectangular bands, arranged according to different angles in order to deviate the granulated products coming out of the projection spout between the cylindrical roller and the endless belt according to different trajectories spread in the vertical plane. Thus, to modify the spread on the ground of the grandulated products projected, the spreader dscribed in the U.S. Pat. No. 3,746,264 allows the angle of the tangent to the belt to be modified, at the level of the ejection point, over the width of the deflection fingers as well as over the value of the associated angles of deflection, that is angles of slanting of the different deflection fingers over the direction of motion of the projection granulated products, coming out of the projection spout.

However, the spreaders of the type described in the U.S.Pat. No. 3,746,264, and in which the projection of the material is ensured by the cooperation of a cylinrical roller and of an endless belt, present numerous disadvantages, relative in particular to the clooging of the material projected, to the imprecision of the stream of the material projected and to the cost of construction of the device, and it may be due to these major disadvantages that no spreader of this type is, to the knowledge of the applicant, presently available in the trade.

Indeed, the use of an endless belt device in a particularly dusty medium does not occur without posing a clogging problem. If the endless belt does not get dirty on its outer surface, due to its deformation and its lengthening, during its winding up on the polleys or on the return rollers, on the contrary a clogging up on the inner face of the endless belt, which is always in close contact with these pulleys, rollers or drums, and above all a large clogging up on the latter is noticed.

Moreover, any flapping of the portion of the endless belt which carries the granulated products beyond the nipping zone by the cylindrical roller, produces a stream which is geometrically defined in an imprecise manner, and therefore more difficult to splay out with the required precision by means of a deflector. Moreover, any deformed area of the endless belt, in particular a lengthening over part of its width, produces when is partially winds up around the cylindrical roller, an area of driving of the granulated products over a larger thichkness than over the rest of the endless belt. This unevenness is at the origin of a projected sheet of granulated product having a non uniform thickness, which prevents a precise spreading of the granulated products. This adds up to the fact that the transverse bending of the endless belt, when the granulated products are taken up, alreadly imposes a delicate adjustment of the spreading deflector. In particular, at the precise moment of the separation between the cylindrical roller and the endless belt, the two moving endless surfaces, facing one another, do not have identical trajectories (substantially rectilinear trajectory for the endless belt, and circular trajectory for the roller) and are more or less deformed by the granulated products compressed between them, while they also prevent very different characteristics of suppleness; the result is that the propelled stream of granulated products has an imprecise direction which varies particularly as a function of the thickness of the sheet of compressed granulated products. This constitutes a major difficulty to deviate and splay out with precision the projected stream of granulated products, by means of a deflector.

On the other hand, it is pratically impossible to make a cylindrical roller spreader cooperating with an endless belt so that it is economic, not only from the manufacturing point of view, but also from that of servicing and maintenance, for it is necessary to provide means of adjusting the tensioning of the belt, means of avoiding and/or correcting the disalignment of the conveyor belt, as well as means allowing the position of the deflector to be adjusted when the relative postions of the roller and of the guides or return pulleys are modified. It is also useful to recall that an endless belt construction necessarily comprises a large number of shafts mounted in rotation, and therefore of plummer blocks.

Finally, in order that a deflector be insentitive to variations in particular in grain sizes, in the shape of the granules and in the flow of the projected granulated products, it is necessary that the surfaces which defines the different directions of spreading required be approached by the granulated products under a very low angle, in order to avoid impacts, and consequently uncontrollable rebounds of the granulated products. Consequently, a deflector acting in a vertical plane and such as proposed in the American patent above-mentioned is not acceptable for use with granulated products as varied as those found in pactice. Indeed, the different deflection fingers present large angles in relation to the stream of projected products, some of these angles being very large. Moreover, these deflection fingers never allow granulated products to be projected under the spreader and towards the center of the latter.

Through the invention, it is proposed to remedy these various disadvantages, and object of the invention is a spreader of granulated products which is reliable, economical to make and to maintain, which allows an excellent geometrical definition of the trajectory of the projected granulated products and the total coverage of the speading width including on the band of ground above which the spreader and the tractor carrying or towing it are displaced.

For this purpose, the spreader according to the invention, of the type presented above, is characterised in that the second mobile endless surface is also formed by the outer lateral face of a second roller mounted in rotation around its shaft on the chassis, and in such a position that the first and the second rollers, one of which at least is provided with a peripheral coating in a material which can be elastically distorted, by substantially externally tangent to one another, so that the granulated products are projected out of the projection spout in a thin sheet centered on the tangent plane shared by both rollers.

The important advantages of such an implementation are that the two rollers cooperating to delimit the projection spout, guarantee an excellent geometrical stability of the sheet projected in the tangent plane shared by the two rollers, i.e. that the average plane of the projected sheet, according to its thickness, is practically merged with the tangent plane shared by both rollers.

The geometrical definition of the projected sheet is thus much more precise when it results from the cooperation of both rollers than when it is ensured by the cooperation of a single cylindrical roller with an endless blet. Moveover, due to the deformations of the outer lateral surface of one at least of the two rollers, but preferably of each of them, during the passage between the two rollers of the granulated products, and by virtue of the peripheral coatings in a material which can be elastically distorted on the rollers, then due to the fact of the release of the granulated products following their nipping between the rollers, and finally due to the centrifugation, it can be seen that the rollers do not clog up in use. Finally, by comparison with an implementation comprising a cylindrical roller and an endless belt, an implementation with two rollers according to the invention presents the advantage of comprising less shafts, therefore less plummer blocks, does not require any belt tensioner, and presents less risk of misalignment.

Advantageously, the first and the second rollers of each casting group are cylindrical rollers the shafts of which are substantially parallel one to the other and preferably substantially horizontal.

In an implementation according to the invention, in which each casting group only comprises the two rollers delimiting the projection spout, it is advantageous, to obtain trajectories with the maximum reach, that the tangent plane shared by the two rollers be slanted outwards and upwards in relation to a vertical plane passing through the base of the hopper, but this then leads to supply the projection spout with granulated products by means of a trough guiding these products from the opening at the base of the hopper. However, the major disadvantage of such a trough is that it limits overmuch the flow of granulated products taken in the projection spout. For this reason it is advantageous that, in each casting group formed solely by two rollers the shaft of the first roller be above and outside the shaft of the second roller in relation to the base of the hopper, each casting group comprising moveover a curved slide, which is borne by the chassis and concavity of which is turned towards the shaft of the first roller, and which guides the sheet of granulated products from the outlet of the projection spout to the spreading means. In such an implementation, the arrangement of the two rollers is favourable since their shared tangent plane is slanted inwards and upwards, i.e. towards the opening at the base of the hopper. The supply of the projection spout is facilitated thereby and improved, but it is necessary moreover to deviate the direction of motion of the projected sheet, at the outlet of the spout, which is ensured by the curved slide. However, the motion of the projection sheet on this slide brings about, by friction, and absorption of a variable part of the kinetic energy of the granulated products, as a function of the nature of the fertiliser, of its moisture content, of the size of its particles, and the relatively strong braking which may result therefrom consequently limits the velocity with which the granular products are projected beyond the downstream extremity of the slide and therefore limit the reach of the trajectories. Consequently, such an implementation is more particularly meant for the projection of products with a low spreading density on a limited width of spreading.

In an advantageous variant of the invention destined to the spreading of granular products over large widths of spreading and with a sizeable density of distribution, the speader comprises moreover means of injection of the granular products into the projection spout of at least one casting group, the said means of injection comprising one injection spout, having an inlet and an outlet the sections of passage of which are progressively and respectively decreasing and increasing, and which is situated between the base of the hopper and the projection spout of each corresponding casting group, and delimited by outer lateral surfaces of two cylindrical rollers substantially externally tangent to one another and mounted in rotation on the chassis, each around it shaft substantially parallel to the shaft of the second roller of each corresponding casting group, one at least of the two rollers which delimit the injection spout being positively driven in rotation from the transmission component of the chassis, so as to constitute a driving roller, driving the granular products introduced from the base of the hopper into the inlet of the injection spout up to the outlet of the latter by transmitting to them such a linear velocity that the granular products leave the outlet of the injection spout in a thin sheet centered on the tangent plane shared by the two rollers delimiting the said injection spout, the means of injection comprising also, for each corresponding casting group, an injection deflector, carried by the chassis and which is curved, with the concavity turned towards the first roller, and which guides the sheet of granular product leaving the outlet of the injection spout up to the inlet of the projecction spout. This variant of the invention is very advantageous, for the preliminary speeding of the grandular products into the injection means allows the feeding pressure of the projection spout with granular products to be increased, and hence ensures the uptakes of a large flow by the two rollers delimiting the projection spout.

Advantageously moreover, the tangent plane shared by the two rollers which delimit the injection spout is substantially perpendicular to the tangent plane shared by the first and second delimiting the projection spout of each corresponding casting group. One thus obtains an implementation in which it is both possible to suitably arrange the two rollers delimiting the projection spout so that their shared tangent plane is directed outwards and upwards, which is favourable to the the attainment of long range trajectories, and to arrange favorably the two rollers delimiting the injection spout so that their shared tangent plane is directed inwards and upwards which favorable to an excellent supply of the injection spout from the hopper, for this supply in granular products can then be ensured by means of dosing and allowing to fall by gravity between two rollers of the corresponding casting group, which are in this case the two rollers delimiting the injection spout, a sheet of granular products, the average plane of which, according to its thickness, is substantially merged with the tangent plane shared by these two rollers. In such an implementation, the advantageous combination of the dosing means, of the means of injection and of the means of speeding and of projection makes it possible to take on larger amounts of granular products at the level of the projection spout. However in order to limit the overall size of the spreader and to save a roller, it is advantageous for the first roller delimiting a projection spout supplied from an injection spout, to form simultanously one of the two rollers delimiting the said injection spout, the other being a third roller, and the shaft of the first roller being situated above the shaft of the second corresponding roller, and, preferably, inside the axis of the latter in relation to the base of the hopper.

In a preferred embodiment, which allows the manufacture of spreaders comprising two casting groups arranged symmetrically to one another, in relation to a median vertical plane of the hopper, each casting group comprises its own means of injection, and the axis of its third roller is situated inside the axis of the second corresponding roller, in relation to the hopper base, and at a level situated between the levels of the axes of the first and second rollers of the corresponding casting group, the roller or rollers positively driven in rotation from the transmission element of the chassis being, for each casting group, either the first roller or the second and third rollers.

On the contrary, if one seeks a more economical variant albeit comprising two casting groups, while being satisfied with an implement offering a reduced spreading width, the shafts of the first and third rollers are substantially situated in the same horizontal plane, so that they delimit an injection spout substantially vertical, and the third roller delimts simultaneously, with a fourth cylindrical roller, also mounted in rotation on the chassis around its shaft substantially parallel to the axis of the first, second and third rollers and situated below the said horizontal plane, so that the third and fourth rollers are substtantially externally tangent to one another, a second projection spout similar to that delimited between the first and second rollers, one at least of the third and fourth rollers being coated with a peripheral coating in a material which can be elastically distorted, and one at least of the third and fourth rollers being positively driven in rotation from the transmission element of the chassis, so that the means of getting up speed and of forced projection are arranged in two casting groups which have a shared injection spout, which comprise one the first and second rollers and the other the third and fourth rollers, and which each cooperate with an associated spreading device, the means of injection comprising also, in addition to the shared injection spout, and to the injection deflector with its concavity turned towards the first roller, and which only extends over a part of the axial dimension of the injection spout, a second curved injection deflector, with its concavity turned towards the third roller, and carried by the chassis and mounted in an adjacent position to the said injection deflector, between the first and third rollers and under the outlet of the injection spout, along the remaining part of the axial dimension of the latter, so that the sheet of granular products coming out of the injection spout is divided into two portions each of which is guided by a corresponding injection deflector up to the inlet of the corresponding projection spout. Thus, starting from a single sheet of granular products got up to speed in a single injection spout, two sheets of projected granular products are obtained, with a more reduced width, and each directed in a direction substantially opposed to the other. In order to ensure in this case a certain symmetry of spreading, the second and fourth rollers and the two injection deflectors have the same axial dimension, which is half that of the first and third rollers and, on the one hand, the second and fourth rollers, and, on the other hand, the two injection deflectors are axially offset one in relation to the other substantially by the value of their axial dimension, so as to divide the sheet of granular products coming out of the injection spout into two portions substantially equal, and to limit to the utmost the axial overall measurements of the second and fourth rollers.

In another variant of the invention, very economical to produce but acceptable only for obtaining reduced spreading widths, the spreader comprises a single casting group comprising the first and second rollers, the axes of which are situated substantially on the same horizontal plane, and which delimit between them a projection spout substantially vertical, with an outlet directed downwards. In this particular varint, it is advantageous that the spreading means comprise two speading deflectors adjacent to one another in the direction of the axes of the rollers, and each presenting a continuous and curved deflection surface one of which has its concavity turned towards the axis of one of the rollers and the other its concavity turned towards the axis of the other roller, and each delimited between an upstream edge, presenting a practically nil slant over the tangent plane shared by both rollers and slightly offset in relation to the said tangent plane, on the side of the roller towards the axis of which the deflection surface considered does not present its concavity, two lateral edges, one of which at least, through which the corresppinding deflector is adjacent to the other, is contained in a plane substanially perpendicular to the axes of the rollers and a downstream edge, defined by a curved cut between the downstream extremities of the two lateral edges, so that the tangents to the said deflection surface, at right angle to the axes of the rollers and along the said cut, are slanted on the tangent plane shared by the rollers by an angle which varies in a continuous manner between a minimum value, preferably nil, and a maximum value, so that the sheet of granular products coming out from the projection spout be divided into two parts each of which is guided and deviated without bursting by one respectively of the two deflection surfaces, from its upstream edge to its downstream edge, beyond which the granulated products form contiguous fractions of part of sheets which follow freely trajectories progressively slanted over the vertical, from one lateral edge to the other of each deflection surface, and on either side of the tangent plane shared by the two rollers.

In the other variants, the means of spreading can be of different types. If they are of the type in which they comprise, for at least one casting group, a spreading deflector, which divides the sheet of granular products coming out from the corresponding projection spout in contiguous fractions of sheets which are deviated, in a plane perpendicular to the axes of the first and second rollers delimiting the projection spout, according to different trajectories presenting angular orientations which vary progressively between two extreme slants in relation to the direction of displacement of the sheet of granular products at the outlet of the said projection spout, as it is already known in the above-mentioned American patent, it is then advantageous that, according to characteristics proper to the invention, the spreading deflector presents a continuous and curved deflection surface, with a concavity turned towards the axis of the second roller, and delimited between an upstream edge, presenting a practically nil slant over the tangent plane shared by the first and second rollers and substantially contained in the said tangent plane, two lateral edges and a downstream edge defined by the curved cut between the downstream extremties of the two lateral edges, so that the deviation angle formed, for all points of the said cut, between the shared tangent plane and the tangent to the said deflection surface passing through the said point and in the corresponding plane perpendicular to the axes of the said first and second rollers, is an angle which, when the said point is moved from one extremity of the cut to the other, varies in a continuous manner between a minimum value, on one lateral edge, and a maximum value, on the other lateral edge, so that the said fractions of contiguous sheets are guided without busting by the deflecting surface, from its upretream edgge to its downstream edge, beyond which they continue freely their trajectories which are progressively slanted according to the tangents to the deflection surface along its downstream edge, and from one lateral edge to the other of the said deflection surface. The total coverage of the spreading width is thus ensured by a density of distribution substantially even of the granular products over this spreading width and, advantageously, the minimum value of the deviation angle is practically nil while the maximum value is of the order of 135°, so that this spreading width extends from the dropping point of the granular products having followed a practically free trajectory from the outlet of the projection spout to the dropping point of the granular products having followed the most deviated path and situated under the spreader itself.

However, in order to avoid too strong impacts of the granular products on the vegetation and on young shoots, when the granular products are spread by following grazing trajectories which one obtains with deflectors fractionating the projected sheet in a vertical plane, the invention also proposes, according to the characteristics proper to it, to use different means of spreading which copmprise, for at least one casting group, a deflector for opening up the projected sheet of granular products in a non vertical plane and substantially parallel to the axes of the rollers delimiting the corresponding projection spout. According to the invention, such a deflector presents a cluster of deflection surfaces which are spaced apart from one another in the direction of the roller axes, substantially at right angle to a plane parallel to the said axes, and each curved between its upstream edge and its downstream edge, while presenting their concavities in one of the two directions of the said axes, so that the planes tangent to the said deflection surfaces along their downstream edges are inclined on the said axes by an angle which varies progressively between a minimum value and a maximum value, from one extremity of the cluster to the other, in order that the deflection surfaces delemit between them curved and adjacent passages each presenting an inlet and an outlet between the said upstream and downstream edges respectively of the two neighbouring deflection surfaces which delimit it, the upstream edges of the deflection surfaces dividing the projected sheet into contigous fractions of sheets each of which is deviated into one of the passages which guides it until its outlet, beyond which it pursues freely a trajectory substantially in the plane tangent to the deflection surface which has deviated it and at the level of the downstream edge of this deflection surface. In order to obtain the greatest spreading width, the above-mentioned maximum value is 90° and the minimum value is such that the corresponding trajectory brings the fraction of sheet which follows this trajectory back towards the vertical point passing through the base of the supply hopper of the corresponding casting group. Advantageously moreover, each deflection surface presents a plane upstream portion, very slightly slanted over the direction of the flow of the sheet projected at the entrance to the passages, preferably by an angle lower than 10°, and sufficiently long so that the whole fraction of sheet moving according to the direction of the flow and guided by the deflection surface, meets this upstream portion of the latter before being deviated by a curved part of this deflection surface, so that the fraction of the corresponding sheet be put in contact with the deflection surface practically without rebound of the granular products over this surface.

Moveover, it is preferable that each deflection surface also presents a plane downstream part, following a curved parrt, in order to determine the orientation of the trajectory of the corresponding fraction of sheet beyond the corresponding downstream edge.

In an advantageous form of implementation, making it possible to ensure a good confinement of each fraction of deviated sheet, each curved passage is delimited by a channel having a bottom, two lateral walls facing one another, one of which is convex and the other is concave and define the deflection surface corresponding to the said passage, each channel being preferably closed by an upper wall, opposite the bottom. In a method of implementation advantageously simple, the bottoms of the channels are formed by a single base plate, the lateral walls of the channels are defined by the opposite faces of curved walls fixed on the base plate at right angle to the latter, and the eventual upper parts of the channels are formed by a single cover plate, so that the deflector for opening up the spread presents the apperance of a flat box, the internal volume of which is subdivided into curved and adjacent channels of passage by partitions.

If the casting group with which is combined such a deflector for opening up the spread is a casting group arranged laterally on the spreader, so that the axes of its rollers are substantially parallel or slightly slanted over the moving direction of the spreader, in order that the corresponding group be destined in particular for lateral spreading of the granular products, it is advantageous that all the deflection surfaces of the same opening up deflector present their concavity turned towards the same side which is preferably, the side opposite to the direction of travel of the spreader.

On the other hand, if the deflector for opening up the spread is combined with a casting group arranged transversely in relation to the direction of motion of the spreader, i.e. so that the axes of its rollers are substantially perpendicular or strongly slanted in the direction of motion of the spreader, in order to ensure, in particular, a spreading of the granular products towards the rear and laterally on both sides, it is advantageous that all the deflection surfaces of the same deflector for opening up the spread form a cluster ssubstantially in the shape of a fan.

In another variant of the spreader in accordance with the invention, the means of spreading comprise, for at least one casting group, one cluster of spreading tubes, having different lengths, the upstream end parts of which are adjacent to one another, present their axes substantially in the median plane of the projected sheet of granular products, according to its thichkness, and in parallel with the direction of motion of the said projected sheet, and divide the latter in contiguous fractions of sheet which are each guided by one of the tubes to its downstream extremity, substantially offset in the direction of motion of the said projected sheet, in relation to the downstream extremities of the other tubes. In this variant of the spreader according to the oinvention, the spreading is ensured, therefore, by a set or cluster of tubes, of a type already known and used in the spreaders with pneumatic transport of the material to be spread. If it is whished to spread over a localised area of the ground each fraction of sheet channelled in one of the tubes, it is then advantageous to equip the downstream extremity of each tube with a deflector, deviating for example the fraction of corresponding sheet towards the ground and/or towards the rear. However, a dispersed spread by means of such tubes is also possible if the downstream extremity of each tube is fitted with a brusting device, towards which is directed the fraction of sheet guided in the corresponding tube and on which the granular products of this fraction of sheet rebound before falling back onto the ground. To allow spreading along localised lines, it is also possible to equip the downstream extremity of the tubes with a supple pipe directed towards the ground. As this is also known in regard to sets of tubes of pneumatic transport for spreaders, it is also possible that the downstream part of each tube be equipped with a dividing end piece, dividing the fraction of sheet guided in the corresponding tube into two parts each of which is spread on one of two areas of the ground which are offset in relation to one another in the direction of motion of the projected sheet. Finally, to spread evenly the granular products over the area of the ground above which the opper or the casting groups of the spreader are moved, one at least of the tubes of the cluster and in particular that set at the rear extremity of the cluster in relation to the direction of motion of the spreader, is curved over at least part of its length, so as bring its downstream extremity closer to a vertical plane passing substantially through the base of the hopper of the spreader.

Moveover, whether the spreading means are formed by a deflector with a continuous and curved deflection surface or by a cluster of curved deflection surfaces, or by a cluster of spreading tubes, it is advantageous, to take into account in particular the physical characteristics of the granular products, to adjust the spreading width by modifying the orientation of the spreading means, when the latter are, for at least one casting group, mounted pivoting on the chassis around at least one axis substantially parallel with the axis of the rollers delimiting the corresponding projection spout.

Finally, as regards the means of dosing, supplying one or several casting groups of the spreader from the hopper, they can comprise a volumetric spreading device, comprising at least one rotating element, driven in rotation in a trough supplied with granular products through an aperture at the base of the hopper, but it is also possible that the means of dosing comprise a mobile gate adjustable in position in regard to an edge of an opening defined at the base of the hopper, between the said edge and a part of the outer lateral surface of one of the rollers of at least one corresponding casting group, the said roller partially protruding into the base of the hopper and ensuring, through its rotation, the direct drivinng away of the granular products towards the corresponding casting group(s). Advantageously, in the particular variant of the spreader according to the invention, in which two adjacent casting groups share injection means, it is advantageous moreover that the dosing means be also shared by the two casting groups.

In order to obtain, with the same spreader, all the desired spreading widths below a maximum width, while only using the part of the spreading means which allows corresponding trajectories to be obtained, it is advantageous moreover that the flow of the sheet of granular products supplying at least one casting group from the hopper be limited between two lateral screens, and that the spreader also comprise at least one shutter which, as well as at least one of the lateral screens, be mobile and adjustable in a substantially transverse direction to the flow of the supply sheet, in order to define its width and/or the position in relation to the rollers of the corresponding casting group(s). This amounts to masking part of the distribution in order to feed granular products only to the part of the projection spout cooperating with the corresponding part of the means of spreading.

The spreader according to the invention can, as already mentioned above, comprise a single or several casting groups, one at least of these casting groups being such that the axes of its rollers are substantially parallel to the direction of motion of the spreader, and-/or one at least of these casting groups being such that the axes of its rollers are slanted over the direction of the motion of the spreader and, in particular, substantially perpendicular to this direction of motion.

The spreader according to the invention can also ensure the spreading of the granular products through different casting velocities, in which case the spreading means can be limited to means of variation or of changing the speed of rotation of the rollers or consist in particular characteristics of structure or of shape of the rollers, making it possible to impart different velocites to the granular products. Eventually, means of spreading with deflectors can be combined with means of spreading with different casting velocities.

In a variant of spreader of this type, it comprises several adjacent casting groups, the first rollers of which have the same radius, and are arranged side by side and coaxial and the second rollers of which also have the same radius and axe arranged side by side and coaxial, the rollers of one of the two sets of adjacent rollers thus defined being driving rollers, driven in rotation at speeds different from one roller to the other, while the rollers of the other set are each mounted loose in rotation around its shaft and driven each by ccontact and fricction from the corresponding driving roller, the means of spreading the granular products comprising in this case means of driving in rotation driving rollers at the said different speeds, so that trajectories of greater or smaller range can be obtained by means of the said different speeds.

Advantageously in this case, each of the adjacent casting groups comprise an injection spout delimited between its first roller and a third roller of a set of rollers of the same radius, arranged side by side and coaxial, and each mounted loose in rotation around its shaft.

In a relatively simple example of implementation, the means of driving in rotation of the driving rollers comprise a set of return pulleys in tiers, different in diameter from one another, independent from one another and each integral in rotation with one of the shafts of a set of tubular and coaxial transmission shafts, each of which is integral in rotation with one respectively of the driving rollers, as well as a driving cone pulley, integral in rotation with a driving shaft and connected to each of the return pulleys by a driving belt.

In another variant of spreader, for which the distribution is ensured by different casting speeds, the spreader comprises several adjacent casting groups, the first rollers of which are coaxial, laid side by side, driven around their shaft at the same angular speed, and have different radii from one roller to another, so as to form a first set of tiered adjacent rollers, the second rollers of the casting groups being also coaxial, set side by side, and having radii different from one roller to the other, but each being mounted loose in rotation around its shaft, so as to form a second set of tiered rollers, which cooperate with the first set of tiered rollers so that the sum of the radii of the first and second rollers of the same casting group is substantially constant from one casting group to the other, in order that the spreading of the granular products be ensured by the different peripheral speeds of the rollers from one casting group to the other.

Finally, according to yet another example of spreader in which the spreading is ensured by different casting speeds, the first and second rollers of at least one casting group are rollers of truncated cone shape, one of which at least is driven in rotation around its shaft, and which are externally tangent to one another along a shared generatrix, preferably substantially horizontal, with concurrent axes, and the small bases are arranged on the same axial side, in order that the spreading of the granular products be ensured by the variation of the peripheral speed of the rollers from one extremity of the shared generatrix to the other, and, therefore, of the projection spout delimited between these two rollers of truncated shape.

Finally, as the trajectory of the granular products is determined by the speed and the direction of the granular products at the outlet of the means of projection and/or of spreading, the spreader according to the invention can also comprise, for at least one casting group, means of variation and/or of adjustment of the speed of rotation of at least one roller of the corresponding casting group(s), in order to modify the spreading width by modifying the tangentiel speed of the roller or rollers and thus the speed imparted to the granular products.

Figure 4A:
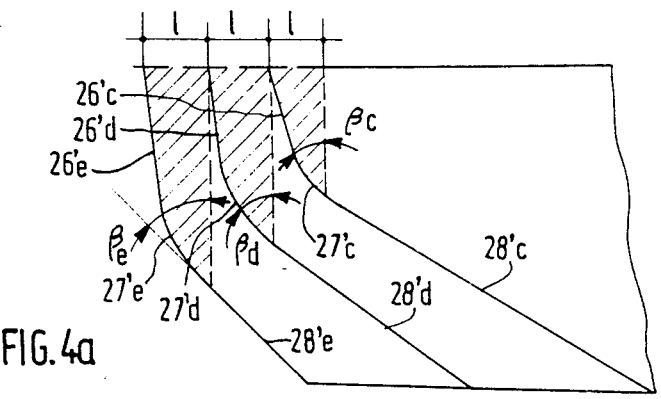
Figure 13:
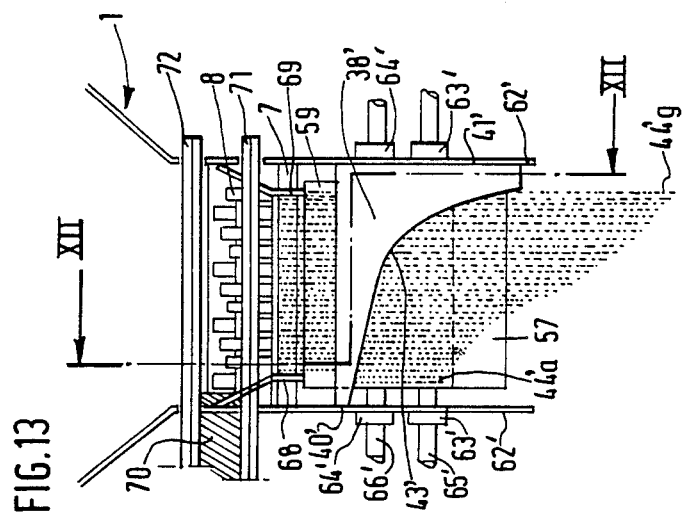
Figure 12:
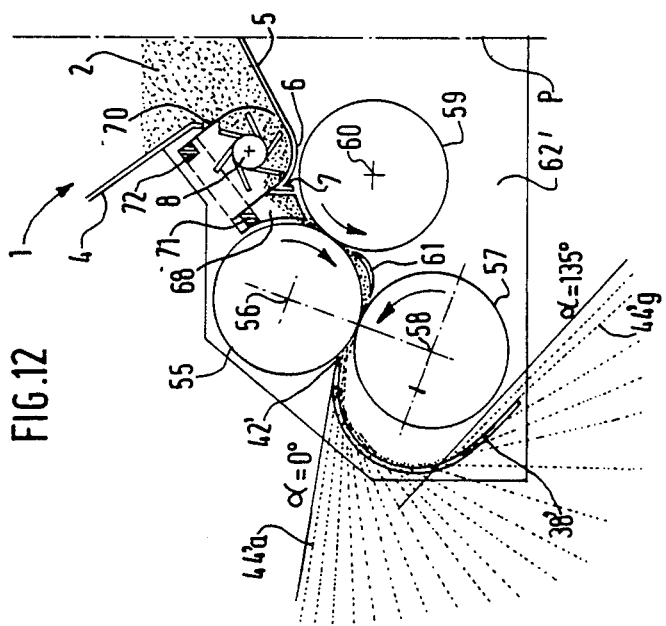
Figure 19:
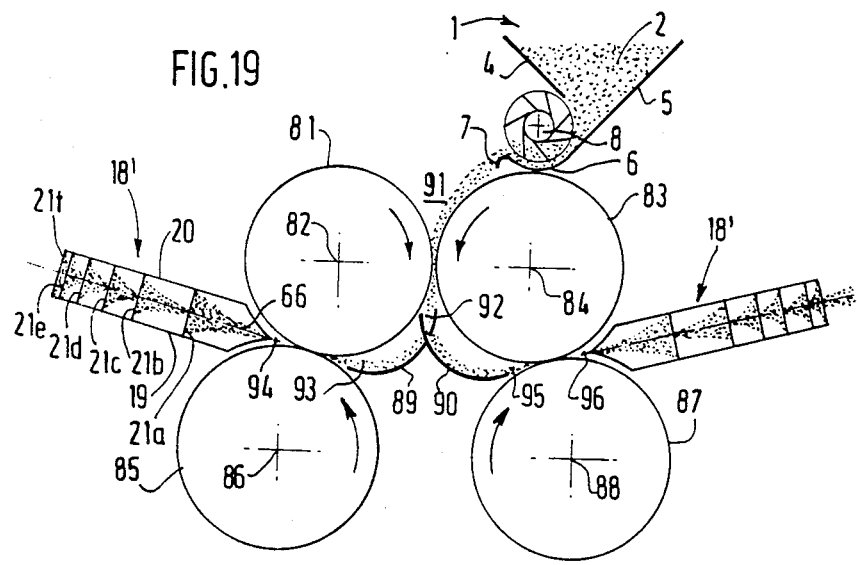
Figure 20:
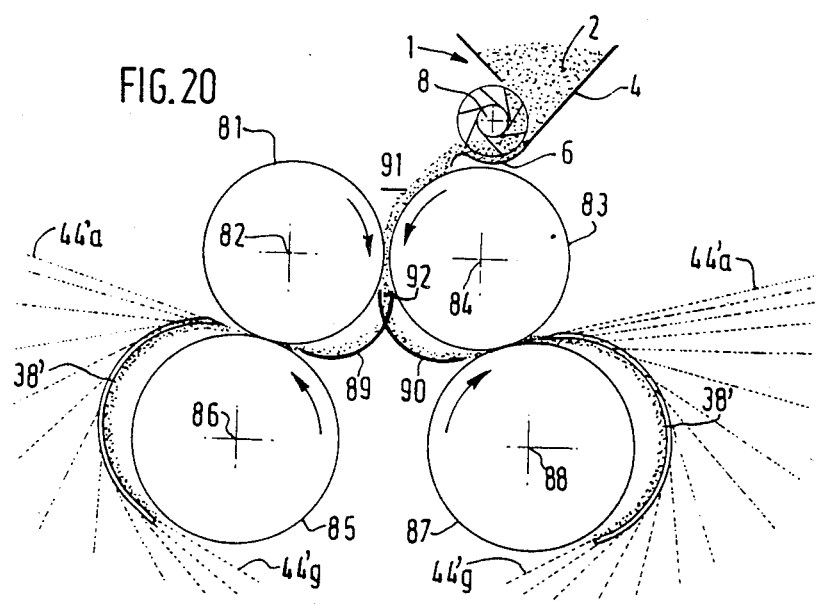
Figure 24:
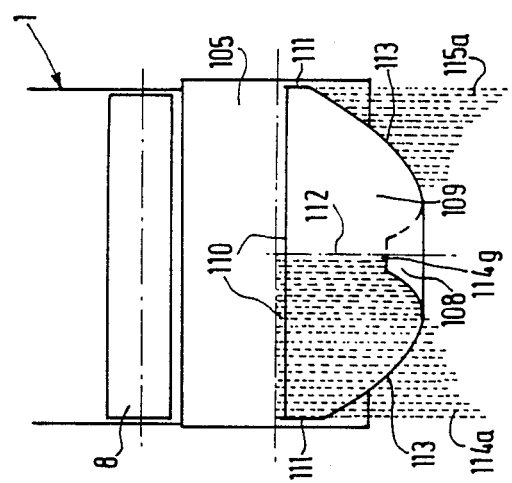
Figure 23:
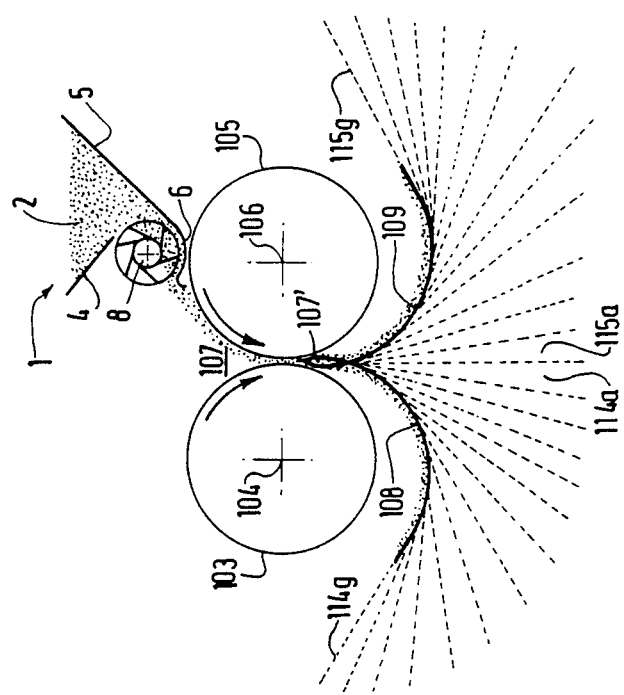
Figure 28:
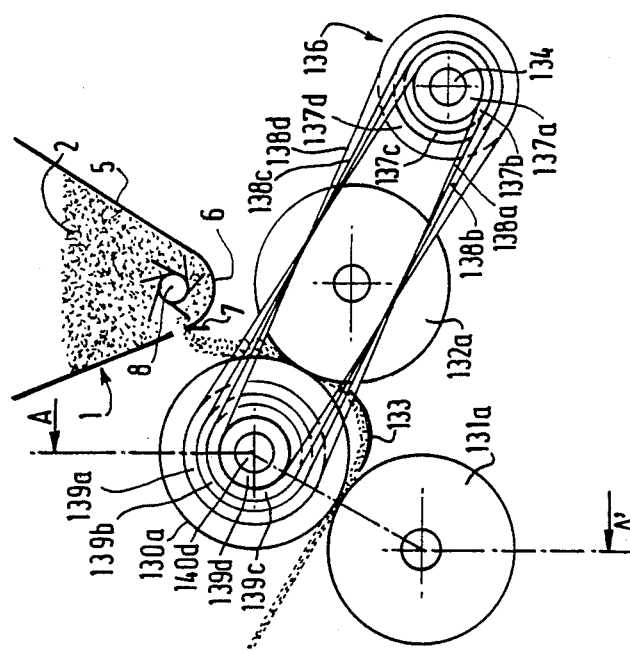

The invention will be better understood, and other characteristics and advantages will appear more clearly on reading the description which follows of several methods of implementation, given as non limitative examples, by reference to the attached drawings in which:

FIG. 1 is a half-view in diagrammatic transverse section of a first spreader fitted with two lateral caster groups symmetrical in relation to the longitudinal and median plane of the spreader, FIG. 2 is a diagrammatic view in section along the plane A—A of FIG. 1 of the splaying deflector associated with the casting group of the spreader shown in FIG. 1, FIG. 3 is a diagrammatic plan view showing the spreader and the spreading zone on the ground of the spread granular products, FIG. 4 is a diagrammatic plan view of a preferred variant of the deflector of FIG. 2, FIG. 4a is a plan diagrammatic view of a disadvantageous variant of the deflector of FIG. 2, making it possible to understand the interest of the variant of FIG. 4, FIG. 5 is a diagrammatic half-view in transverse section similar to FIG. 1, of a second example of spreader with two caster groups arranged laterally and symmetrically in relation to the longitudinal and median plane of the spreader, FIG. 6 is a diagrammatic view in lateral elevation of the caster group of the spreader of FIG. 5, FIG. 7 is a diagrammatic view in transverse section of a third example of spreader with two lateral and symmetrical caster groups, FIG. 8 is a diagrammatic view in plan of the spreader of FIG. 7, FIG. 9 is a view similar to FIG. 1 for a fourth example of a spreader with two lateral and symmetrical caster groups, FIG. 10 is a similar view to that of FIG. 2 of the splaying deflector of the caster group of the spreader of FIG. 9, FIG. 11 is a view similar to FIG. 3 for the spreader of FIG. 9, FIG. 12 is a view similar to FIG. 5 for a fifth example of spreader with two symmetrical and lateral caster groups, FIG. 13 is a diagrammatic section along XII—XII of the spreader of FIG. 12, FIG. 14 and 15 are views respectively similar to FIGS. 12 and 13 for a different adjustment of the width of the projected sheet of granulated products, FIG. 16 is a view in perspective of the deflector of FIGS. 12 to 15, FIG. 17 is a similar view to that of FIG. 7 of a sixth example of a spreader with two lateral and symmetrical groups of casters, FIG. 18 is a diagrammatic view and in plan of the spreader of FIG. 17, FIG. 19 is a diagrammatic view in transverse section of a seventh example of spreader, with two lateral caster groups equipped with a splaying deflector, FIG. 20 is a view similar to FIG. 19 of an eighth example of a spreader with two lateral caster groups each equipped with a deflector in a vertical plane, FIG. 21 is a view similar to FIGS. 7 and 17 of a ninth example of a spreader with two lateral caster groups, FIG. 22 is a diagrammatic view in plan of the spreader of FIG. 21, FIG. 23 is a diagrammatic view in transverse section of a ninth example of spreader, but comprising a single caster group, FIG. 24 is a view in lateral elevation of the spreader of FIG. 23, FIG. 25 is a diagrammatic view in longitudinal section of a tenth example of spreader, having a single caster group set transversely in relation to the direction of motion of the spreader, FIG. 26 is a view in elevation of the rear of the spreader of FIG. 25, FIG. 27 is a diagrammatic plan view of the spreader of FIGS. 25 and 26, FIGS. 28 and 29 are diagrammatic view respectively in elevation from the rear and according to a section through the axis AA', of FIG. 28 of a variant of a spreader with a spread by means of different projection speeds, FIGS. 30 and 31 are diagrammatic views in elevation respectively from the rear and side of a variant with sets of tiered rollers, and FIGS. 32 and 33 are views similar to FIGS. 30 and 31 of a variant with conical rollers.

The spreader shown on FIGS. 1 to 3 comprises a storage hopper 1, of a suitable capacity to ensure sufficient autonomy for the spreader during the working phase in a field, and which is mounted on a carrying chassis (not shown) made of conventional manner like all the chassis of agricultural implements, and movable behind a tractor. The said chassis is equipped in the forward part with a towing device of a well known type so-called "three points" with hydraulic lift, compatible with the towing devices of agricultural tractors, when the spreader is meant to be carried behind such a tractor. On the contrary, if the spreader is meant to be drawn behind a tractor, the carrying chassis is fitted with ground contact wheels, and, in the forward part, with coupling gear for towing. In both cases, a transmission shaft, meant to be coupled to a power take off from the tractor, is mounted in rotation on the chassis to ensure the driving in rotation of the various rotating elements of the spreader which will be presented hereunder.

The hopper 1 contains a load 2 of granular products, for example fertilizers, which flow progressively through each of the two lateral openings 3 (one of which only is visible in FIG. 1), provided symmetrically in the base of the hopper 1, and each delimited between a lateral wall 4 of the hopper which is slanted towards the vertical, longitudinal and symmetrical plane P of the hopper 1 and of the spreader, and a slanted flank of a bottom 5 the transverse section of which is in the shape of an inverted V and the point of which is in the plane P. Each slanted flank of the bottom 5 is terminated, at the base of the hopper 1, by a rounded part slightly raised in the shape of a through 6, on the edge of the lateral opening 3 and extending outward and downward into a small flap 7. In each of the two lateral troughs thus formed 6 (one of which only is visible on FIG. 1), a volumetric distribution cylinder 8 is driven in rotation around a longitudinal and horizontal axis 9 and this cylinder 8 delimits together with the trough 6 a distribution channel for the fertilizers. The whole of these elements form a dosing and volumetric distribution device ensuring the supply of granulated products to a caster group 10 described hereunder. By volumetric distribution device is meant a distribution device ensuring a supply of products distributed independently from the physical qualities of this product. For this purpose, the distributing cylinder 8 can be fitted with radial blades. The distribution cylinder 8 is positively driven in rotation, from the transmission mounted on the chassis, in a direction of rotation such that it carries into the corresponding distribution channel fertilizers which flow through the the opening 3, in an even flow, and in a sheet of fertilizers falling by gravity beyond the flap 7, towards the caster group 10.

This caster group 10 comprises a first cylindrical roller 11 positively driven in rotation, in the same direction as the distributing cylinder 8, around its shaft 12, which is secured on the chassis and parallel to the shaft 9, as well as a second cylindrical roller 13 mounted loose in rotation on the chassis around its shaft 14, which is parallel to the shafts 12 and 9, and fixed, at a lower level than that of the shaft 12, itself below the level of the shaft 9, the shaft 14 moreover being inside the shaft 12 in relation to the plane P, but very slightly outside the shaft 9. Moreover, the shaft 14 is so positioned that the two rollers 11 and 13 are very substantially tangent externally to one another. The outer lateral surface of the rollers 11 and 13 is coated with a peripheral coating of solid rubber of a Shore hardness of 40, and thus presenting properties of elastic deformation to contacts under pressure with the fertilizer granules. The rollers 11 and 13 are mounted in rotation on shafts (not shown) the two ends of which are housed in plummer blocks (also not shown) carried by the chassis. The two rollers 11 and 13 are substantially of the same diameter, and they delimit between them a projection spout the input of which 15, of a progressively decreasing passage section, is turned towards the dosing and volumetric distribution device at the base of the hopper 1, whereas the outlet 16 of the spout, of a progressively increasing passage section, is turned downward and outward, in relation to the plane P. The sheet of fertilizers distributed by the trough 6 and the distributing cylinder 8 falls by gravity into the input 15 of the spout, and the relative positions of the shafts 9, 12 and 14 are so chosen that the average plane of this sheet of fertilizers, according to its thickness, is substantially merged, when this sheet enters the input 15, with the tangent plane shared by the two rollers 11 and 13. This sheet of fertilizers is then taken over by the driving roller 11 which drives it towards the outlet 16 and the motion of the mass of fertilizers is transmitted by friction to the lower roller 13, which is thus driven in rotation around its axis 14, in the reverse direction to the direction of rotation of the driving roller 11. The sheet of fertilizers is thus nipped between the two rollers 11 and 13, at the level of the generatrix of contact of the latter, and, taking into account the high revolving speed of the driving roller 11, driven from the transmission carried by the chassis, this roller 11 transfers to the sheet of fertilizers passing through the spout sufficient linear velocity so that at the outlet 16 of the spout, when the sheet of fertilizers is freed from the grasp of the rollers 11 and 13, its kinetic energy is such that the fertilizers are projected in a thin sheet the average plane of which, according to its thickness is merged with the tangent plane shared by the two rollers 11 and 13. The latter thus constitute a speeding up and forced projection device of a sheet of fertilizers which, when it comes out of the outlet 16 of the projection spout, is received and deviated by a fixed slide 17. The said slide 17, secured on the chassis is a curved sheet metal part presenting its concavity towards the axis 12 of the upper roller 11, and the upstream edge of the slide 17, substantially parallel with the contact generatrix between the two rollers 11 and 13, is contained in a plane parallel to the tangent plane shared by the two rollers but slightly offset towards the axis 14 of the roller 13, in order that the projected sheet may, in the outlet 16 of the spout be received tangentially onto the slide 17 and progressively deviated by the latter without rebound of the fertilizers, hence without bursting of the sheet down to the downstream edge of the slide 17, at the level of which the plane tangent to the latter is a plane parallel to the axes 12 and 14 of the rollers and slanted outward and upward, according to an angle of sight favourable to obtained the greatest range. Through its downstream edge, the slide 17 is directly adjacent to a deflector 18 for splaying the sheet projected laterally and towards the rear, so as to ensure a so-called "horizontal" spreading of the fertilizers projected. As shown in FIGS. 1 and 2, this splaying deflector 18 has substantially the shape of a flat box formed by a base plate 19 and a cover plate 20, having the same shape substantially trapezoidal and parallel with one another as well as to the plane tangent with the slide 17 at the level of its downstream edge, and on either side of this tangent plane. The two plates 19 and 20 are held securely apart g from one another by a cluster of partitions 21a to 21g which are steel plates perpendicular to the plates 19 and 20. The partition 21g, towards the front of the spreader, is a plane partition closing the deflector box 18 towards the front and substantially perpendicular to the axes 12 and 14 of the rollers 11 and 13. With the exception of this partition 21g, all the other partitions 21a to 21f are curved partitions presenting their concavity turned towards the back of the spreader, on which the rollers 11 and 13 are mounted so that their axes 12 and 14 are substantially parallel to the direction of motion of the spreader. Moreover, the average radii of curvature of the curved partitions increase progressively from partition 21a to 21f: one thus obtain that the splaying deflector 18 is subdivided between the two plates 19 and 20, into adjacent and curved channels, substantially divergent each from its entrance, directly adjacent to the downstream edge of the slide 17, to its outlet offset laterally and/or towards the rear. Moreover, the shape of the partitions 21a to 21g of the cluster is such that the angles formed between the direction of the axes 12 and 14 of the two rollers and the planes tangent to the partitions 21a to 21g at the level of their downstream edges are angles which decrease progressively from 90°, for the partition 21g to a negative value of about 20° for the partition 21a. One thus obtains that a continuous projected sheet of fertilizers deviated by the slide 17 up to the input of the deflector 18 is subdivided, by the upstream edges of the partitions 21a to 21f into contiguous fractions of sheet each of which is thus received, confined, guided and deviated into one of the curved channels of the deflector 18, and each of these fractions of sheet 22a to 22g comes out laterally and/or towards the rear of deflector 18 while following a trajectory contained in the plane tangent to the partition which has deviated it, at the level of the downstream edge of the latter, except for the fraction of sheet 22g which is not deviated by the partition 21g and continues freely on its trajectory perpendicular to the axes 12 and 14 of the rollers. One thus obtains that the single sheet projected is subdivided into contiguous fractions some of which, fractions 22d to 22g ensure a lateral distribution of the fertilizers, while others 22b and 22c ensure a spreading towards the rear and that finally fraction 22a, and to a lesser measure, fraction 22b, also allow fertilizers to be spread over the strip of ground above which the tractor, the hopper and the caster groups of the spreader are moving. The result is a spreading of the fertilizers as shown in plan view on FIG. 3, in which the spreader with its two lateral casting groups, such as 10, each combined with its slide such as 17 and with its splaying deflector such as 18, is designated as whole by the reference 23, and moves in the direction of the arrow F. When stopped, the area of ground on which the fertilizers are spread is an area 24 in the shape of a bent sausage which is delimited laterally by the transverse fractions of sheet 22g and 22′g not deviated by the deflectors, and, to the rear, by the most deviated fractions of sheet 22a and 22′a, which draw nearer to the rear of the longitudinal median plane P to the point of substantially crossing one another in this plane P. The motion of the spreader 23 makes it possible to cover an area of ground over a continuous spreading width, with a density of spreading of the fertilizers which may be rendered uniform over the spreading width, or, on the contrary, may be made to follow a predetermined variation according to this width and eventually to be regrouped over several non adjacent strips of ground, separated from one another by strips over which no fertilizer is spread, due to the choice of the number of deflection partitions 21, to the profile of their concave deflection surface, which deviates a corresponding fraction of sheet, and therefore to the angles of the tangents to these partitions at the level of their downstream edge.

In the example of splaying deflector shown in FIG. 2, each of the partitions 21a to 21f presents a small upstream portion which is plane and perpendicular to the axes 12 and 14 and to the median plane of the projected sheet, at the passages of the downstream edge of the slide 17, and that small upstream portion is followed by a more or less curved portion which extends up to the downstream edge of the corresponding partition. This implementation, although satisfactory, is not the most favourable and may be advantageously replaced by that diagrammatically shown in plan view in FIG. 4.

Indeed, it is acknowledged as a principle that, for a deflector to be insensitive to the variations of particle sizes, of the shape of the grains and to the flow of a projected granular product, it is necessary that the surface which define the different directions desired be approached by the projected product under a very low angle, in order to avoid shocks and therefore uncontrollable rebounds.

On FIG. 4, has been shown in 19 the base plate of the deflector on which the deflection partitions are fixed, three of which only have been shown in 21'c, 21'd and 21'e. The upstream edges such as 25c to 25e of the partitions are regularly spaced from one another over the width of the projected sheet leaving the slide 17 while moving in the direction of the arrow $F_1$, so that this projected sheet of fertilizers is divided into contiguous fractions of sheet each having the same width $p$, equal to the ratio of the total width of the undivided sheet to the number of intervals formed between the upstream edges of the partitions. Each partition comprises an upstream portion such as 26c to 26e, which is plane and slightly slanted over the direction of the arrow $F_1$ (direction of the speed vector of the projector sheet) at a very low angle $\gamma$, of the order of 5°, and this plane and slightly slanted upstream portion is sufficiently long for the corresponding fraction of sheet of width $p$ to come in contact over its whole width with this upstream portion 26c to 26e, before the latter connects with a central curved portion 27c to 27e, ensuring the desired deviation of the corresponding fraction of sheet, and this followed by a downstream portion, also plane, such as 28c to 28e, in the plane of which the corresponding fraction of sheet freely continues its trajectory beyond the corresponding downstream edge, such as 29c to 29e.

Therefore, for each direction of spreading desired for a fraction of sheet of fertilizers, the modification of the orientation of the fraction of sheet only starts when this fraction of sheet has been put in contact over its whole width with an upstream part of partition such as 26c to 26e, making a very low angle with the direction of the sheet leaving the slide 17 and projected outside the rollers. The deflection partons shown on the FIG. 4, therefore, allow the application of the principle of contact without rebound of a projected sheet of granular products with the deflection surface or surfaces, in a splaying deflector of the sheet in a "horizontal" plane.

Had the deflection partitions presented the shapes shown in FIG. 4a, with a short plane upstream portion, such as 26'c to 26'e, followed by the curved central portion such as 27'c to 27'e, extended itself by a long plane downstream portion such as 28'c to 28'e the deviation of each fraction of sheet of width $p$ would have been started earlier, but part of each fraction of sheet would have reached the corresponding deflection surface, in its curved portion such as 27'c to 27'e or even at the beginning of its downstream portion such as 28'c to 28'e, under a very large angle $\beta c$, to $\beta e$, causing uncontrollable rebounds according to the flows and characteristics of the granulated product.

The second example of spreader, partially represented on FIGS. 5 and 6 is also spreader with two lateral caster groups, with an axis parallel to the direction of motion of the spreader and symmetrically arranged in relation to the longitudinal and median plane P of the spreader.

In this second example, each caster group 30, which is constituted by two rollers externally tangent to one another 31 and 33, mounted in rotation on the chassis respectively around their fixed axes 32 and 34, while delimiting between them a projection spout, and cooperating with a slide 37, presents substantially the same components having the same relative positions and operating in the same manner as in the caster group 10 of the spreader of FIGS. 1 to 3, so that it is not necessary to describe it again in detail. This second example of spreader is essentially distinguished from the first by the structure of the dosing device of the supply of the input 35 of the projection spout with granular products from the hopper 1, and by the structure of the distribution device mounted downstream from the slide 37.

In this second example of spreader, the dosing device comprises a gate 39 in the shape of a rectangular plate, mounted sliding through its smaller sides into two rails (not shown) fixed on the lower part of the external face of the lateral wall 4 of the hopper 1, the gate 39 having its large sides parallel to the lower edge of this wall 4, so as to delimit a lateral and rectangular opening for the supply with granular products 2 from the hopper 1, the said rectangular opening being delimited between the lower edge of the gate 39 and the opposite part of the outer lateral surface of the roller 33, the upper part of which protrudes into the hopper 1, between the lateral wall 4 and the bottom 5 of the latter. In this example, the roller positively driven from the transmission mounted on the chassis is the lower and inner roller 33, as that can also be the case in the first example, and one thus ensures in this second example, a direct feed of the granular products 2 by the rotation of the roller 33, through the opening delimited between this roller and the gate 39, and thus in quantity dosaged in relation to the position of this gate in relation to the wall 4 of the hopper 1. The supply flow to the projection spout is thus proportional, for a given axial dimension of the device, on the one hand to the distance separating the roller 33 from the gate 39, adjustable in position in both directions of the arrow $F_2$ of FIG. 5 and, on the other hand, to the speed of rotation of the driving roller 33.

The other essential difference of this second example in relation to the first concerns the spreading device which, in this case, is a deflector 38 ensuring a splaying in the "vertical" plane of the sheet of fertilizers projected and deviated by the slide 37. This deflector 38, substantially of the type of that shown on FIG. 16 and described hereunder in a more detailed manner by reference to the example of implementation of FIGS. 12 to 16, is a curved steel plate, fixed to the chassis and the concavity of which is turned downwards and towards the plane P of the spreader. The deflection surface of this deflector 38 is its concave face, which is continuous and substantially curved in an arc of circle in a plane perpendicular to the axes 32 to 34, and this deflection surface is delimited between four edges, the upstream edge of which is substantially parallel to the downstream edge of the slide 37, hence also to the axes 32 and 34 and situated in a plane parallel to the median plane of the projected sheet leaving the downstream edge of the slide 37, but slightly offset on the side of the axis 32 of the roller 31, in order that the projected sheet be received, in its whole thickness, over the deflection surface and approaches the latter substantially tangentially. This allows the implementation of the principle presented above, and relative to the insensitivity of a deflector to the variations in the size of the particles the shape of the grains and the flow of the projected granular products and to the absence of shocks and hence of uncontrollable rebounds, when the granular products approach the deflection surface. The downstream edge of the deflector 38 is cut obliquely between its two lateral edges, and in such a way that the angle formed between the direction of the sheet projected and deviated at the outlet of the slide 37, and the tangent, in a plane perpendicular to the axes 32 and 34, to the deflection surface and passing through a point of the oblique cut of the downstream edge of the latter, in an angle which increases by a practically nil value, at the level of a lateral edge 40 of the deflector 38' which is perforce a small curved edge, up to a maximum value clearly higher than 90°, at the level of the other lateral edge 41, which is a large curved edge of the deflector 38, so that the projected and continuous sheet passing beyond the downstream edge of the slide 37 is divided in adjacent fractions of sheet among which that at the extremity of the sheet skirting the small lateral edge 40 is only hardly deviated or even not at all, as shown in 44a on FIGS. 5 and 6, while the fraction of sheet of the other extremity, deviated by the deflector 38 without bursting, along its large lateral edge 41, is deviated at most and at such an angle that its trajectory, beyond the downstream edge 43 of the deflector 38, is directed downwards and towards the median plane P of the implement. Between the end fractions of sheet 44a to 44g, the fractions of sheet are progressively and continuously deviated by an angle which increases as and when one moves along the cut of the downstream edge 43 from the lateral edge 40 towards the lateral edge 41. The deflector 38 thus allows the projection and spreading of the fertilizers even under the implement, and the contour profile of its downstream edge 43 can be adapted to the spreading on the ground with the desired spreading density. In order that the whole of the sheet coming out of the slide 37 is taken up by the deflector 38 it is moreover advisable that the upstream edge 42 of the deflector 38 be situated substantially in the radial plane passing through the downstream edge of the slide 37. It should be noted that the deflector 38 splaying in a vertical plane has a simpler structure than the deflector 18 splaying in a "horizontal" plane of the preceding example, since it only presents one deflection surface. However, the deflector 38 shall only be used advantageously for spreading granular products on fields in which the plants have not started to shoot. Indeed, the deflector 38 gives a certain number of grazing trajectories which run the risk of causing very large impacts of the fertilizer on the vegetation, so that if the latter has started to shoot it is preferable to use sectors of splaying in a "horizontal" plane, such as the deflector 18 of the preceding example.

A third example of spreader has been shown diagrammatically in FIGS. 7 and 8, with two lateral caster groups arranged symmetrically on both sides of the median longitudinal plane P of the implement and each of which comprise only two rollers with an axis substantially parallel to the direction of the implement. For this caster group one thus finds again the upper and outer roller 11 and the lower and inner roller 13 already described in the first example, occupying the same relative positions one in relation to the other and cooperating in the same manner in order to delimit between them a projection spout, the latter being supplied with granular products 2 from the hopper 1 through a volumetric dosing device equivalent to that described by reference to FIG. 1, i.e. comprising with blades 48 driven in rotation in a lateral output trough from the hopper 1 and delimited between a rounded up part 6 extending the bottom 5 of the hopper 1 and the lower edge of the lateral wall 4 of the said hopper. This third example of spreader, therefore, is only distinguished from the first by the structure of the spreading device which comprises, for each caster group, a cluster 50 of spreading tubes similar to those used to ensure the transport of the material to be spread in pneumatic spreaders. In this example, each cluster comprises six tubes of different lengths. Five of them, tubes 50a to 50e, of progressively decreasing lengths, are rectilinear tubes mounted side by side while the sixth tube, tube 50f, on the rear side of the spreader, is a tube curved in the horizontal plane and towards the rear, so that its downstream extremity is substantially in the vertical plane passing through the axis of the outer and upper roller 11 of the corresponding caster group. The upstream extremities 51 of the six tubes of each cluster 50 are directly adjacent to one another so that the axes of the upstream portion of the tubes are in the same plane, which is that of the median plane of the projected sheet coming out from a slide 47 which guides the latter from the outlet of the corresponding projection spout to the intake of the cluster of tubes. Moreover, the axes of the upstream portions 51 of the tubes are perpendicular to the axes of the rollers 11 and 13 and thus parallel to the direction of motion of the sheet projected and deviated by the slide 47, so that these upstream end portions 51 of the tubes divide this sheet into contiguous fractions of sheet each of which is guided by one of the tubes to its extremity. Due to the differences in lengths of these tubes 50a to 50e and to the curved shape of tube 50f, the downstream extremities of the tubes are spread substantially evenly in a transverse direction in relation to the motions of the spreader. At its downstream extremity, each of the tubes of each cluster is equipped with a small deflector 52 which deviates the fraction of sheet guided and transported by the corresponding tube downwards and, eventually, simultaneously or as a variant, towards the rear, in the direction of a bursting device 53, in the shape of a dished steel disk suspended in a fixed manner under the corresponding deflector 52, so that the corresponding fraction of sheet is deviated by the deflector 52 and directed by the latter onto the corresponding bursting device 53, on which the corresponding fraction of sheet is projected and bursts, by rebounds of the granular products, falling back in a cone on the ground, around the bursting device 53. This example of implementation guarantees with precision that a spreading width is obtained, but the latter is substantially reduced in relation to that which can be obtained with the first example of spreader (see FIGS. 1 to 4), due to the dissipation of energy by friction in the transport tubes.

The three examples of spreaders described above are more particularly meant for spreading products which have to be spread at a low spreading density, and over relatively limited spreading widths, due respectively to the natural limitation of the output of the product taken up between the two rollers of the caster group, directly fed from the hopper, and to the presence of a slide 17, 37 or 47 at the outlet of the projection spout to give the projected sheet a direction of motion favourable to its uptake by the distribution devices with which the spreaders are equipped.

If one wishes to be free from these two limitations, to ensure the spread of larger outputs of products over larger spreading widths it is preferable to use one of the three examples of spreaders described hereunder.

The spreader diagrammatically shown in FIGS. 9 to 11 is also a spreader with two lateral caster groups arranged symmetrically on both sides of the median plane P of the implement, and each caster group cooperates with a spreading device which is a deflector splaying in the "horizontal" plane practically identical to the deflector 18 of the first example (see FIGS. 1 and 2). Moreover, each caster group is supplied from the hopper 1 through a dosing device with a volumetric distribution substantially identical to that of the first example, i.e. comprising a bladed rotating cylinder 8 driven in rotation around its shaft 9, parallel to the direction of motion of the spreader and set in the trough delimited between the lower edge of the lateral wall 4 of the hopper 1 and the part curved upwards 6 at the lower extremity of the bottom 5. This example of spreader is thus only distinguished from the first example by the implementation of each caster group.

The latter comprises three rollers, a first roller of which 55, is the upper position, is simultaneously externally tangent to a second roller 57, in the lower position and slightly offset towards the outer part of the first roller 55 in relation to the plane P, and to a third roller 59, offset towards the inner part of the first roller 55 in relation to the plane P and at an intermediate level between the first roller 55 and the second roller 57, these three rollers being each mounted in rotation respectively around their shaft 56, 58, 60 which are all three parallel to the axis 9 of the distributing cylinder 8 and to the direction of motion of the implement.

In this example, and in an economic manner, the first roller alone 55 is positively driven in rotation from the transmission carried by the chassis, but in a variant, it is possible that the two rollers 57 and 59 be simultaneously positively driven in rotation, the first roller 55 than being mounted loose in rotation around its shaft. The relative positions of the shafts 56, 58, 60 of the three rollers and of the dosing device are so chosen that, on the one hand the tangent plane shared by the two rollers 55 and 57 is perpendicular to the tangent plane shared by the two rollers 55 and 59, and that, on the other hand, the granular products distributed by the dosing device 8 fall by gravity into the intake of the spout delimited between the two rollers 55 and 59 in a continuous sheet the average plane of which according to its thickness, is practically merged with the tangent plane shared by these two rollers 55 and 59. In other words the velocity vector of the supply flow of the spot between the rollers 55 and 59 is in the tangent plane shared by these two rollers and in a direction perpendicular to their axes. The granular products falling into the intake 62 of the spout between the rollers 55 and 59 are thus speeded up by the cooperation of these two rollers revolving at high speed and are projected in a sheet at the outlet 63 of the said spot where this speeded up sheet is taken up without bursting, by approaching tangentially the upstream edge of a curved slide 61, with its concave face turned towards the axis 56 of the first roller 55, and the downstream edge of which is substantially parallel to the tangent plane shared by the two rollers 55 and 57, but slightly offset in relation to this tangent plane on the side of the axis 58 of the roller 57. In this manner, the sheet of granular products speeded up between the rollers 55 and 59, is injected by the slide 61 into the inlet 64 of the spot delimited between the rollers 55 and 57, and the sheet thus projected outside the outlet 65 of the latter spout is directly taken up by the splaying deflector 18'. The fixed position of rollers 55 and 57 determines the angle of the trajectory with the maximum reach: this angle is the angle formed by the tangent plane shared by these two rollers and the horizontal direction. The roller 59 thus constitutes an injection roller, cooperating with the first roller 55 to delimit an injection spout, the orientation of which is extremely favourable to a good supply through the dosing device, the injection device thus formed also comprising the injection slide 61 and the first roller 55 which, simultaneously, is a projection roller cooperating with the second roller 57 to delimit the projection spout, the orientation of which is also very favourable to obtaining trajectories ensuring a large spreading width. The total coverage of this spreading width, with a density of spreading equal to the variations of the granular products from the most distant point up to the plane P, of the implement, is obtained by inserting the splaying deflector 18' in the trajectory of the sheet projected at the outlet 65 of the projection spout. In order to encourage the division of this projected sheet into contiguous fractions, each of which is deviated into one of the curved channels adjacent to the deflector 18', and to avoid losses to products on the sides of the deflector 18', between the latter and the two rollers 55 and 57, it is advantageous that the upstream extremities of the deflection partitions 21a to 21g be cut into triangles presenting an apex engaged in the outlet 65 of the projection spout.

Zone 67' has been shown in diagram form on FIG. 11, in the shape of a curved sausage, on which the granular products are spread from the spreader, represented overall by the reference 68', and so that the motion of the latter in the direction of the arrow F ensures the coverage of a band of area on the ground. The shape of zone 67' is substantially that of zone 24 of FIG. 3, but its dimensions are larger. This results from the fact that the example of the spreader of FIG. 9 provides a higher velocity to the granular products at the inlet of the deflector 18', due to the absence of any slide between the latter and the two rollers 55 and 57, with the consequence that the particles are hardly braked by friction after these rollers.

The fifth example of spreader, shown on FIGS. 12 to 15 is only distinguished from the one which has just been described above by the nature of the spreading device associated with each lateral caster group and accessorily, by complementary arrangements of the dosing device allowing the spreading width of the projected sheet to be selectively limited and hence the value of the spreading width of the device.

Indeed, we find again a caster group comprising three rollers the upper roller of which 55 of axis 56 delimiting with the lower roller 57 of axis 58 a projection spout and on the other hand delimiting, with the intermediate roller 59 of axis 60, and injection spout at the outlet of which the sheet speeded up between the rollers 55 and 59 is deviated and guided into the inlet of the projection spout by the slide 61. On FIG. 13, which is a side view of FIG. 12 with the upper roller 55 removed, the two cheeks of the chassis 62' have been shown, each being substantially of trapzeoidal shape and set transversely, and between which the three rollers of the caster group are mounted swiveling, in bearing blocks formed by bearing cases, such as those shown in 63' and 64' for the rollers 57 and 59, which are, in this example, driven by driving shafts 65' and 66'. Between the checks of the chassis 62' is also mounted the spreading device formed, in this example, by a deflector 38' splaying in a vertical plane, of a structure very close to that of the deflector 38 of the spreader shown on FIGS. 5 and 6. Like the deflector 38, the deflector 38' shown in perspective on FIG. 16, is a curved sheet metal piece, having the shape of a portion of cylinder delimited between two lateral edges 40' et 41', curved in an arc, a straight edge 42', according to the generatrix of the cylinder, and which constitutes the upstream edge of the deflector, and a downstream edge 43' in the shape of a cut curved between the downstream extremities of the lateral small edge 40' and of the lateral large edge 41'. Through its curved lateral edges 40' and 41', the deflector 38' is adjacent respectively to each of the cheeks 62', and the upstream edge 42' extends at right angle to these two cheeks and between them, while being substantially contained in a plane parallel to the tangent plane shared by the two rollers 55 and 57, hence to the average plane, according to its thickness, of the sheet projected by these rollers, but slightly offset in relation to this plane on the side of the shaft 56 of the roller 55, so that, as in the example of the spreader of FIGS. 5 and 6, the uptake of the whole porjected sheet is ensured by the upstream edge of the deflector 38' substantially tangentially to the direction of motion of the sheet, and hence without any burst of the said sheet which is guided and progressively deviated by the deflector 38'. The downstream edge 43' of the latter, formed by a cut out whose shape evolves progressively from one lateral edge to the other, is such that the angle formed between the tangent plane shared by the two rollers 55 and 57 (containing the velocity vector of the projected sheet, which is perpendicular to the axes 56 and 58 of these rollers) and the tangent to the concave inner surface of the deflector 38', in a plane perpendicular to the axes 56 and 58 and passing through a point of the downstream edge 43', is an angle α which varies between 0°, at the level of the small lateral edge 40', and 135°, at the level of the large lateral edge 41', the variation of the angle between these two values being continuous, progressive, so that the deflector 38' deviates by its inner and concave deflection face, the projected sheet coming out of the projection spout between the rollers 55 and 57, while dividing this sheet into continuous fractions deviated in a differential manner, according to an increasing angle from one lateral edge to the other of the deflector 48', and while proceeding, beyond the downstream edge 41', in free trajectories slanted according to the tangents to the deflector 38' along this downstream edge 43'. Thus, the fraction of sheet 44a'taken up by the deflector 38' at the level of its lateral edge 40', for which the angle between the tangent at the level of the downstream edge 43' and the tangent plane shared by the two rollers 55 and 57 is nul, follows a trajectory corresponding to the free trajectory of the projected granular products which corresponds to the maximum spreading range, while the fraction of sheet 44'g, taken up by the deflector 38' at the level of its lateral curved large edge 41', is deviated by an angle of 135° in relation to its direction of motion at the outlet of the projection spout so that this fraction of sheet 44'g is directed under the spreader and towards the longitudinal median plane P of the latter. The other fractions of sheet are progressively deviated in a continuous manner by an angle increasing between these two extreme values, and follow trajectories allowing to reach points on the ground situated between the outermost point, reached by the fraction of sheet 44'a, and the point situated innermost (towards the plane P) reached by the fraction of sheet 44'g. To secure the deflector 38' to the cheeks of the chassis 62' oblong holes 67 have been provided in the vincinity of the lateral edges 40' of the deflector, and in the deflector 38' and allowing securing nuts to be fitted and tightened on holdfasts (not shown) integral with the cheeks 62', the oblong shape of the hole 67 also allowing the position of the deflector 38' to be modified on the chassis substantially according to an overall rotation of the deflector 38' around a geometric axis 58' indicated on FIG. 14 as being substantially in the middle of a radius of the roller 57 this axis 58' being the axis of curvature of the deflector 38'. Thus, the angle of deviation at any point of the downstream edge 43' of the deflector 38' corresponds to the angle at the center which subtends the arc of a circle delimited by the intersection of the inner and concave deflection surface of the deflector with the plane perpendicular to the axes of the rollers and passing through the point considered of the downstream edge 43', except at the level of the small lateral edge 40' which is practically not curved.

Thus, as in the example of FIGS. 5 and 6, the total coverage of the spreading width with a distribution ensured even under the implement, is obtained through the insertion of the splaying deflector 38' in the trajectory of the projected sheet of granular products, and, as in the example of FIG. 9, the position of the projection rollers 55 and 57 determine the angle of the trajectory allowing the maximum reach to be attained, and, which is the angle formed over the horizontal by the tangent plane shared by the two projection rollers 55 and 57, this plane also being in this case perpendicular to the tangent plane shared by rollers 55 and 59 delimiting between them an injection spout in which the granular products supplied in a sheet the median plane of which is substantially merged with the tangent plane shared by these two rollers 55 and 59, are speeded up then guided by the injection slide 61 up to the inlet of the projection spout.

To ensure the spread of the granular products over the maximum spreading width of the implement, one uses the whole width of the deflector 38' between its lateral edges 40' and 41', as is shown in FIGS. 12 and 13. If one wishes to spread the granular products over a more reduced spreading width, it then suffices to use the area of the delector 38' whose angular cut of the downstream edge 43", corresponds to the trajectories required, which is carried out, in this example by feeding with granular products only this portion of the deflector 38' by masking part of the distribution, as is shown on FIGS. 14 and 15. Indeed, in this example one finds again a dosing device of the type ensuring a volumetric distribution and comprising essentially a cylinder with paddles 8 positively driven in rotation in a trough delimited laterally at the base of the hopper 1 between the lower edge of the lateral wall 4 of the said hopper and the rounded lateral part 6, with an overflow flap 7, of the bottom 5 of this hopper so that the cylinder 8 and the rounded part 6 delimit between them a channel in which the granular products 2 are shifted by the blades driven by the cylinder 8 and poured by gravity between the rollers 55 and 59. Moreover in this example, the sheet of granular products falling between the rollers 55 and 59 is laterally limited between two flaps 68 and 69, each in the shape of a very open V and arranged facing one another so that they delimit a convergent space, one of the flaps 69 being secured to the chassis and the other 68 mounted sliding on this chassis along two beams 71 and 72 parallel to the axes of the rollers and to that of the cylinder 8. In order to close laterally as well as possible the injection spout, the lower parts of the flaps 68 and 69 extend against the lip 7 and the parts of the rollers 55 and 59 opposite. Moreover, a mask 70, in the shape of a curved steel plate engaged between the lateral wall 4 of the hopper and the blades of the cylinder 8 until it comes in the immediate vicinity of the bottom 5 through its curved extremity with the hollow side turned towards the axis of cylinder 8, is also mounted sliding on the beams 71 and 72, and integral with the flap 68 moving along the said beams. If suffices, therefore to displace the mask 70 and the lateral flap 68 over the beams 71 and 72, for example by moving them towards the other fixed flap 69, from the position on FIG. 13, to partially mask the opening, which, at the base of the hopper, allows the granular mass to flow towards the supply channel between the cylinder 8 and the rounded bottom 6. The simultaneous displacement of the mobile lateral panel 68 with the mask 70 makes it possible to reduce in the same measure the width of the sheet of granular products falling by gravity into the injection spout between the rollers 55 and 59 then deviated, after speeding up, through the slide 61 and then projected out of the projection spout between the rollers 55 and 57. On FIG. 15, the device has been shown in a configuration in which the mobile lateral flap 68 guiding the flow into the injection spout and the mask 70 have been shifted from the position shown on FIG. 13 towards the fixed lateral flap 69 over a distance substantially equal to half the axial distance of the rollers, so that the sheet of granular products successively fed by gravity into the injection spout, speeded up by the latter, deviated by the slide 61 and projected by the projection spout, has a width substantially equal to half the sheet taken up by the device in the configuration shown in FIG. 13. Moreover, this half width sheet is taken up by half the deflector 38' which gives to the contiguous fractions of sheet deviated the most slanted trajectories in relation to the free trajectory. Thus, the fraction of sheet 44'd, which corresponds to the edge of the sheet reduced by half and having travelled along the mobile flap 68, is deviated by an angle of about 45° in relation to the tangent plane shared by the two rollers 55 and 57 and in which is situated the velocity vector of the sheet projected, at the level of its uptake by the upstream edge 42' of the deflector 38'. The contiguous fractions of proejcted sheet 44'd to 44'g, shown on FIGS. 14 and 15, and obtained in the case of a reduced sheet width, therefore correspond to the part of the contiguous fractions deviated and proejcted such as they are shown in FIGS. 12 and 13, and which gives a reduced spreading width in relation to the maximum spreading width obtained in the configuration of FIGs. 12 and 13.

It is of course also possible to make provision for the lateral flap 69 to be a mobile flap with a mask similar to the mask 70 and movable along the beams 71 and 72, in order to choose, through an adjustment of the relative positions of the two flaps 68 and 69 and of the two corresponding masks, the part of the deflector 38' which will be used to obtain trajectories ensuring spreading over strips of ground more or less close to the vertical and median plane P of the device. Through the use of a small mobile mask adjustable in position along the beams 71 and 72, independently of the flaps 68 and 69, one can also factionate the supply sheet of granular products into two non adjacent parts each of which is received on one of tow non adjacent parts of the deflector 38', in order to ensure the spreading of the granular products over two strips of ground parallel to one another but not adjacent and more or less offset laterally in relation to the median and ldongitudinal plane P of the implement. This example of implementation, therefore, makes it possible to obtain all the spreading widths desired, inside a maximum width determined by the tangent plane shared by the two rollers 55 and 57, by limiting the supply to the zone or zones of the deflector 38' which correspond to the distances of projection chosen.

Moreover, a gear box can also be mounted on the chassis between the driving shafts 65' and 66' of the rollers 57 and 59, and also between the driving shaft of the bladded cylinders 8 on the one hand, and, on the other hand, the transmission meant to be coupled to the power take off of the tractor, so that the user may modify the rotation speed of the rollers in order to consequently modify the width of spreading.

The sixth example of implementation, shown on FIGS. 17 and 18, is a spreader with two lateral caster groups, arranged symmetrically on either side of the median plane P of the implement, and each of the three rollers type, exactly as in the two example described previously by reference to FIG. 9 and to FIGS. 12 to 15 respectively. Each of the caster groups is supplied from the hopper 1 by a dosage device identical to that shown on FIG. 9 or on FIGS. 12 to 15. Moreover, each caster group cooperates with a distribution device which, in this example, is formed by a cluster 50'a of distribution tubes substantially identical to the cluster 50 fo the example of FIGS. 7 and 8. The only difference with the latter is that the upstream end parts 51' of the tubes 50'a to 50'f of the cluster are directly opposite the outlet of the projection spout, between the rollers 55 and 57, and are not linked to this outlet by a slide such as 47 of FIG. 7. As for the rest, one finds, at the downstream end of each tube, a deviating or deflecting end piece 52' cooperating with a bursting device 53' uder the same conditions as the deflectors 52 and bursting devices 53 of the example of FIGS. 7 and 8. This implementation brings the same advantages as that of FIGS. 7 and 8, with the assurance moreover of a velocity at the intake of the tubes 50'a to 50'f which is higher, and which thus allows larger flows, due to the suppression of any notable friction between the outlet of the projection spout and the entrance of the tubes, due to the suppression of the slide 47 of FIG. 7.

The seventh example, shown on FIG. 19, comprises two upper rollers 81 and 83, mounted in rotation on the chassis around their respective shafts 82 and 84, parallel to one another and to the direction of motion of the implement, and arranged in the same horizontal plane. These two upper rollers 81 and 83 are substantially externally tangent to one another in order to delimit between them a vertical injection spout, the outlet of which 92 is in a lower poistion and the input 91, in an upper position, is supplied with granular product 2 originating from the hopper 1 through a dosing device with volumetric distribution identical to that fitted on the implementations of FIGS. 7, 9, 12 and 17, and comprising a distributing bladed cylinder 8 in a lateral opening at the base of the hopper 1, between the lateral wall 4 and the bottom 5 with a rounded trough 6 with a pouring lip 7, the supply of the inlet of this injection spout being carried out by gravity. Moreover, the spreader comprises two lower rollers 85 and 87, mounted in rotation on the chassis each round its respective axis 86 and 88, which are parallel to the axes 82 and 84 and also arranged in the same horizontal plane, the axis 86 however being outside the axis 82 of the roller 81 in relation to the injection spout, while the axis 88 of the roller 87 is outside the axis 84 of the roller 83 in relation to the same injection spout, the relative positions of the axes 86 and 88 in relation respectively to the axes 82 and 84 being such that the lower 85 is substantially tangent externally to the roller 81 and delimits with the latter a projection spout with an input 93 and an output 94, while the lower roller 87 is also substantially tangent externally to the upper roller 83 and delimits with the latter a second input projection spout with an input 95 and an output 96. Due to the relative position of the axes 86 or 88 of the lower rollers 85 and 87 in relation to the axes 82 or 84 of the upper roller 81 or 83 to which each of the lower rollers is externally tangent, the common tangent planes to, on the one hand, the rollers 81 and 85, and, on the other hand, to the rollers 83 and 87, and which correspond to the average plane, according to their thickness, of the sheets projected out of the corresponding projection spouts, are planes slanted outwards and upwards in relation to the vertical plane of the injection spout 91–92. These orientations are thus very favourable to obtaining trajectories ensuring the maximum reach. The two upper rollers 81 and 83 have the same axial dimension, which is twice that of the two lower rollers 85 and 87, which are axially offset in relation to one another by a distance substantially equal to their own axial dimensions. The spreader comprises moreover two injection slides 89 and 90, which are similar to the injection slide 61 of the examples of FIGS. 9 and 12. The two injection slides 89 area adjacent to one another in a vertical and transverse plane, and they are offset axially in the same measure as the lower rollers 85 and 87, so that the slide 89, with its concave face turned towards the axis 82 of the upper roller 81, ensures through its upstream edge, an uptake at the output 92, of the injection spout of half the sheet of granular products speeded up in the latter and guides it and deviates it until it injects it tangentially into the input 93 of the projection spout between the rollers 81 and 85, and at the output of which, in 94, this half injected and projected sheet is taken up by a splaying deflector 18′ identical to that used in the example of FIG. 9. The other curved injection slide 90, with its concave face turned towards the axis 84 of the upper roller 83, takes up tangentially, at the output 92 of the injection spout, the other half of the granular products speeded up in the said spout, and guides and deviates this half sheet which is injected tangentially into the input 95 of the projection spout between the rollers 83 and 87, this half injected and projected sheet then being taken up tangentially by another splaying deflector 18′, whose structure and operation shall not be described again. Thus two lateral caster groups combined with a common injection spout fed by a common dosing device are implemented. The sheet speeded up in the injection spout is then divided into two parts each of which is projected outside one of the two projection spouts and then spread laterally, on one side of the spreader, by a splaying deflector in a "horizontal" plane. In relation to the implementations of FIGS. 9, 12 to 15 and 17 and 18, the vertical overall measurements of the implementation of FIG. 19 are greater, but it makes it possible to benefit by a loading height, between the outlet of the trough 6 and the central part of the injection spout 91–92, which is sizeable, so that the uptake pressure of the granular products into the said spout is large, which ensures high outputs. Moreover, the implementation of FIG. 19, is more economical than those of FIGS. 9, 12 to 15 and 17, for it only comprises four rollers instead of six and a single dosing device instead of two. However due to the division of the injected sheet into two half sheets projected laterally on one side and the other this implementation is of interest only to ensure spreading over relatively reduced widths.

In this implementation as in the previousones, the stresses which guide the choice of the roller or rollers which must be positively driven in rotation from the power take off of the tractor are that one at least of the two rollers which first come into contact with the granular products, in particular in an injection spout, must be driven positively to ensure the flow of the granular products. Moreover, one at least of the two rollers which is last in contact with the granular products, in all cases at the level of the projection spout, must be driven positively to guarantee the casting speed and hence the spreading width. For these reasons, in the implementation of FIG. 19, the rollers positively driven can be the rollers 81 and 83, or the rollers 81 and 87, or the rollers 83 and 85. In these three cases, the two other rollers are mounted loose around their shaft and driven by friction and through the granular products.

The eighth example of implementation, shown of FIG. 20, is only distinguished from that which has just been described by the nature of the distribution device associated with each of the two pairs of rollers delimiting one of the two projection spouts. Indeed, the four rollers 81, 83, 85 and 87 are found again, delimiting, through the upper rollers 81, 83 the shared injection spout 91–92, and, between each of the lower rollers 85 and 87, and the corresponding upper rollers 81 or 83, a projection spout in which half of the sheet speeded up between the upper rollers is injected by means of the two injection slides 89 and 90. One also finds again a unique dosing device with volumetric distribution. On the contrary, each of the two "horizontal" splaying deflectors 18′ of FIG. 19 has been replaced by a deflector 38′ splaying in a vertical direction, of a structure and operation quite identical to that shown in FIG. 16 and fitted on the spreaders of FIGS. 12 to 15. In this example, it should be noted that the cooperation of the rollers 81 and 85 with the associated deflector 38′ is the same as that of rollers 55 and 57 with the corresponding deflector 38′ in the example of FIG. 12 to 15.

The ninth example of implementation, represented on FIGS. 21 and 22, also comprises four rollers mounted and cooperating as in the implementation of FIGS. 19 and 20, to delimit two projection spouts and a single injection spout fed by a single dosing device. The same numerical references areas, therefore, used to designate the equivalent elements. On the contrary, the spreading devices, mounted on each side of the spreader, are formed each by a cluster 100 of spreading tubes similar to the clusters 50 and 50' of the examples of implementation of FIGS. 7 and 17. However, each cluster 100 is formed of only five rectilinear tubes, of different lengths 100a to 100c, and does not comprises any tube curved towards the rear. The upstream extremities 101 of the tubes of each cluster 100 are adjacent, directly opposite the outlet of the corresponding projection spout and perpendicular to the axes of the rollers delimiting this spout. Due to the axial offsets of the two lower rollers 85 and 87, the two clusters 100 are also offset axially by the same distance. The downstream extremity of each of the tubes is shaped as an end piece 101 curved downwards and extended by a supple conduit substantially vertical 102, so that the clusters of tubes 100 allow spreading in localised lines parallel to the direction of motion of the spreader.

The tenth example, shown on FIGS. 23 and 24, is an economic implementation, acceptable only for reduced spreading widths. This spreader comprises only two rollers 103 and 105, mounted in rotation on the chassis around their shafts 104 and 106 respectively, which are parallel to one another, to the direction of motion of the spreader and in the same horizontal plane. These two rollers are externally tangent to one another in order to delimit between them a vertical projection spout the input on which 107 is fed by gravity with granular products originating from the hopper 1 through a dosing device with volumeric distribution such as already described above in reference to numerous implementations. One only of the two rollers 103 and 105 is positively driven in rotation, the other being mounted loose in rotation on its shaft and driven by friction through the granular sheet. The latter speeded up and projected into the projection spout, is subdivided into two equal parts at the outlet 107' of this spout by two splaying deflectors 108 and 109 which have substantially the same shape as the deflector 38 or 38' of the implementations of FIGS. 5, 12 to 15 and 20 and which occupy substantially the positions of the slides 89 and 90 of the implementations of FIG. 19 and 20. More precisely, the deflectors 108 and 109 are two parts in curved sheet-metal, each of which is delimited by an upstream rectilinear edge 110, having a length which is substantially half the axial dimension of the roller 103 and 105, two lateral edges curved in planes parallel to one another and one of which 111 is smaller than the other 112, and a downstream edge 113 formed by a curved cut out extending from the downstream extremity of the small lateral edge 111 up to a short distance from the downstream extremity of the large lateral edge 112, this cut out being such that the angle formed between the tangent to the corresponding concave and continuous deflection surface, along its small lateral edge 111, and tangent to this deflection surface passing through a point of the cut out and in a plane perpendicular to the corresponding upstream edge 110, is an angle which increases in a continuous manner from 0° to about 120°, when this point is shifted from the extremity of the cut out on the small lateral edge 111 up to its other extremity close to the large lateral edge 112. The two deflectors of the partition 108 and 109 are secured on the chassis side by side, according to the axial direction of the rollers 103 and 105, while being adjacent to one another through their big lateral edge 112, and the deflector 108 is such that it presents its inner continuous concave deflection surface turned towards the axis 104 of the roller 103, and its upstream edge 110 being parallel to the axes 104 and 106 and parallel to or very slightly slanted over the tangent plane shared by the rollers 103 and 105, but slightly offset on the side of the axis 106 of the roller 105 in relation to this shared tangent plane. In a symmetrical manner in relation to this shared tangent plane, but with the axial offset equal to half the length of the rollers 103 and 105, the other deflector 109 presents its inner continuous and concave deflection surface turned towards the axis 106 of the roller 105, and its upstream edge 110 parallel to the axes 104 and 106 parallel to or very slightly slanted over the tangent plane shared by the rollers 103 and 105, but slightly offset on the side of the axis 104 of the roller 103 in relation to this shared tangent plane, as this is clearly shown in FIGS. 23 and 24. In this way, the sheet of granular products received in the intake 107 of the projection spout, between the rollers 103 and 105, is speeded up and projected at the outlet 107' of the said spout, where the sheet is divided along its width in two halves each of which is taken up substantially tangentially by the upstream edge 110 respectively of one of the deflectors 108 and 109, and guided and deviated without bursting by the corresponding deflection surface up to the corresponding downstream edge 113. Beyond the downstream edge 113 of the deflector 108, the corresponding half sheet is divided in contiguous fractions of half sheet pursuing their free trajectories progressively slanted from the vertical, for the fraction of half sheet 114a having followed substantially the small lateral edge 111 of this deflector 108, up to a trajectory slanted by about 15° over the horizontal and directed laterally outwards and upwards, followed by the fractions of half sheet 114g having followed substantially the large lateral edge 112 of this deflector 108. Similarly the other half sheet is divided in contiguous fractions according to progressively slanted trajectories, on the other side of the vertical tangent plane shared by the two rollers 103 and 105, from a vertical direction (fraction of half sheet 115a having substantially followed the edge of the small lateral edge 111 of the deflector 109), to a trajectory slanted by 15° over the horizontal and directed outwards and upwards (fraction of sheet 115g having substantially followed the large lateral edge 112 of this deflector 109). The distribution is thus ensured laterally on both sides of the tangent plane shared by the two rollers 103 and 105. This implementation, economical when considering of the structural means used is reserved for spreading over reduced working widths, due to the friction of the granular products on the defelctors 108 and 109, this friction being all the greater that the granular products remain a long time in contact with the corresponding deflector, i.e. that the trajectories are long.

All the examples of implementation described above comprise one or two "lateral" caster groups, i.e. formed by rollers the axes of which are substantially parallel to the direction of motion of the spreader.

It is of course possible that different caster groups be arranged in sets on the same spreader, to ensure the spreading of granular products on angular areas defined by different angles of azimuth, the axes of the corresponding rollers then being consequently more or less slanted over the direction of motion.

On FIGS. 25 to 27, a last example of spreader is shown in diagram form. It has a simplified structure and is of the so-called "transverse" type, for it is equipped with a caster group whose rollers have axes 122 and 124 perpendicular to the direction of motion of the spreader, indicated by the arrow F on FIGS. 25 and 27.

The caster group is constituted solely by the upper roller 120 and by the lower roller 121, mounted in rotation on the chassis around their parallel axes 122 and 124 which are contained substantially in the same vertical plane. The two rollers, externally tangent to one another, thus delimit a projection spout substantially horizontal, fed with granular products 2 originating in the hopper 1 in the same way as in some of the previous examples, i.e. through a cylinder dosing device of volumetric distribution 8 fitted with blades and cooperating with the trough 6 of the bottom 5 of the hopper, the pouring lip 7 forming an injection slide in the spout. The outlet of the latter opens up directly opposite a deflector 125 splaying fanwise in a substantially "horizontal" plane. This deflector 125 is similar to the deflectors 18 and 18′ of FIGS. 2, 11 and 19 in that it is constituted, between a base plate 127 and a cover plate 126, parallel to one another, by a cluster of adjacent and curved channels, delimited by curved and non adjacent partitions, perpendicular to the plates 126 and 127, the upstream extremities of which are parallel to the direction of motion of the projected sheet coming out from the projection spout substantially according to the tangent horizontal plane shared by the two rollers, while the downstream extremities of the partitions are slanted according to different angles to splay the sheet projected into continuous fractions of sheets according to trajectories along different directions, in order to cover the spreading width. In this example however, the cluster of partitions 128a to 28i is such that the partition 128e of the middle of the cluster is plane and always parallel to the direction of the sheet projected, while partitions 128a to 128b of the half cluster on the same side of the central partition 128e are curved and present their concave face turned on that side with average radii of curvature decreasing from the partition 128d closest to th central partition 128e to the partition 128a farthest from the central partition and that partition 128f to 128i of the other half of the cluster, and on the other side of the central partition 128e are also curved so as to present their concave face towards this other side and have average radii of curvature which decrease from partition 128f which is the closest, to partition 128i which is the farthest from the central partition 128e. This fan shape structure ensures a distribution towards the rear and laterally on both sides of the spreader, over a spreading width limited due to the large angular deviations necessary to project laterally.

Figure 29:
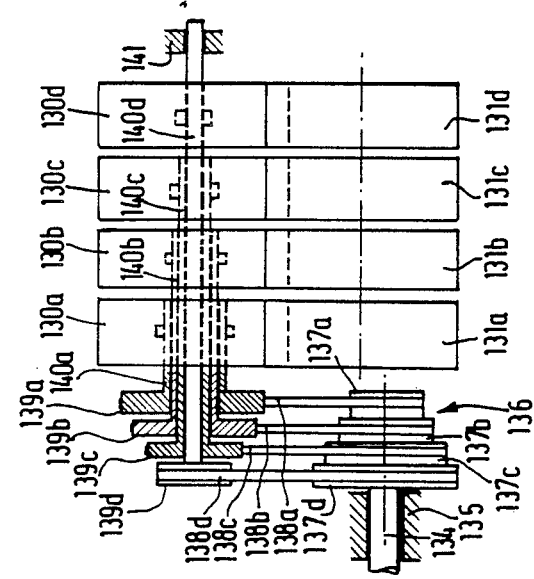

The spreader of FIGS. 28 and 29 is formed of four adjacent caster groups, the first rollers of which 130a to 130d form a first set of coaxial rollers, arranged side by side and of the same radius. Similarly, the second rollers 131a to 131d of the caster groups form a second set of rollers of the same radius, arranged side by side, coaxial and with their common axis parallel to that of the rollers 130a to 130d which are arranged above the rollers 131a to 131d and slightly offset in relation to the latter towards the hopper 1 and the supply device (6, 7, 8) of the type already described in the examples. Moreover, each caster group comprises an injection spout delimited between the first corresponding roller 130a to 130d and one such as 132a of the rollers of a third set of coaxial rollers, arranged side by side and of the same radius, towards the inner part of the first and second rollers, substantially under the hopper 1, at an intermediate level between the first and second rollers. Each of these third rollers, such as 132a, is externally tangent to the first corresponding roller 130a to 130d so that their common tangent plane is perpendicular to the shared tangent plane of the roller 130a to 130d and 131a to 131d.

Each of the four adjacent caster groups is thus supplied under the same conditions as the caster group shown in FIG. 9; the granular products are supplied in a continuous sheet poured from the base of the hopper 1 through the rotating distribution element 8, and centered, according to its thickness in the shared tangent plane of the first and third rollers delimiting the corresponding injection spout and the sheet speeded up at the output of this injection spout is deflected and directed towards the inlet of the projection spout delimited between the corresponding first and second rollers, by an injection deflector 133 shared by the four caster group, and similar in all aspects to the inejction deflector 61 fo the example of FIG. 9.

In the example of FIGS. 28 and 29, the second rollers 131a to 131d and the third rollers such as 132a are each mounted loose in rotation around their respective shaft, while the first rollers 130a to 130d are driving rollers driven in rotation around their common shaft, at different speeds from one roller to the other. The second and third rollers are thus driven in rotation around their respective shafts by contact and friction with the sheet of granular products and/or of the first rollers 130a to 130d.

Driving of the first rollers 130a to 130d at different speeds from one roller to the other, which increase from the rotation speed of the first roller 130a to the rotation speed of the roller 130d, is ensured by means of a driving shaft 134, mounted swivelling in a plummer block 135 of the chassis, with which is integral in roation a tiered driving pulley with four adjacent scored cheeks 137a to 137d, the radii of which progressively increase from one circular cheek to the other, from the end cheek 137a with the smallest radius to the end cheek 137d with the greatest radius. Each of the four tiers of the tiered driving puller 136 is linked by a transmission belt 138a to 138d respectively to one of the polleys of a set of tiered pulleys 139a to 139d, with a progressively decreasing radius from one pulley to the other. Thus the circular cheek 137a with the smallest diameter is linked by the belt 138a to the return pulley 139a with the greatest diameter, and, conversely, the cheek 137d with the greatest diameter is linked by the belt 138d to the return pulley 139d with the smallest diameter. The four return pulleys 139 a to 139d are arranged side by side, coaxially and are each integral in rotation with one respectively of the four tubular coaxial transmission shafts 140a to 140d, mounted in rotation from one another, the central shaft 140d being moreover mounted swivelling in an end plummer block 141 of the casing. This shaft 140d is integral in rotation with the first roller 130d while the tubular shaft 140c which surrounds it, and which is shorter, is as far as it is concerned integral in rotation with the first roller 130c. Similarly, the tubular shaft 140b, shorter than the shaft 140c and which surrounds it, is integral in rotation with the first roller 130b, and finally this shaft 140b is itself surrounded by a shorter shaft 140a which is integral in rotation with the first roller 130a.

In this example of implementation, the spreading of the granular products is ensured by their projection at different casting speeds accroding to whether they are speeded up and projected by one or the other of the four adjacent groups. This device does not require means of deflection to ensure the spreading, for the driving means at different speeds of the driving rollers in fact form the means of spreading.

A spreading by means of different casting speeds is also ensured in the example of the spreaders of FIGS. 30 and 31. This series of spreaders also comprises four adjacent caster groups, the first cylindrical rollers of which 142a to 142d are coaxial, set side by side, and integral in rotation one with the other and with a shared driving shaft (not shown) around their common axis 143 which is horizontal. Moreover, the driving rollers 142a to 142d have radii whose value decreases from one roller to the other, so that they form a set of tiered adjacent rollers. The projection spout of each of the caster group is delimited by one of the first cylindrical rollers 142a to 142d with a second cylindrical roller, which is one of the rollers 144a to 144d of a second set of tiered adjacent and coaxial rollers, set side by side, and each mounted loose in rotation around their common shaft 145. This shaft 145 is parallel to the axis 143, but offset towards the outside and below the latter in relation to the hopper 1 and to the supply device with a rotating distributing component 8. The second tiered rollers 144a to 144d have radii whose value increases from one roller to another in the same measure as the value of the radii of rollers 142a–142d decreases, so that the sum of the radii of the first and second rollers (142a, 144a–142b, 144b–142c, 144c–142d, 144d) of each caster group is constant and equal to the distance separating the two shafts 143 and 145. Each of the four projection spouts of the spreader is fed from a distributing device and from the hopper by one of the four slides 146a to 146d which are adjacent and extend downwards and outwards the pouring lip 7 of the trough 6 at the base of the hopper 1, and which are centered in their lower or downstream part by presenting their concave face towards the shaft 143, so that the downstream edges of each is engaged in the input of the corresponding projection spout.

Due to the driving in rotation of the driving rollers 142a to 142d with the same angular speed, and due to the different radii of these driving rollers, their peripheral or tangential speeds are different from one roller to the other, which ensures the projection of the granular products according to different trajectories 147a to 147d the trajectory 147d with the greatest reach being that of the granular products projected by the spout delimited between the driving roller 142a with the greatest radius and the loose roller 144a with the smallest radius, and the trajectory 147d with the smallest reach corresponding to the spout delimited between the driving roller 142d with the smallest radius and the loose roller 144d with the largest radius.

The spreader according to the FIGS. 32 and 33 comprises a caster group with a simplified structure, also ensuring the distribution of the granular products by different casting speeds, which are tangential or peripheral speeds of truncated conical rollers in rotation.

The caster group comprises an upper truncated conical first roller 148, driven in rotation around its shaft 149, which is slanted from top to bottom and from inside out, from its large base 150 towards its small base 151, and in relation to the hopper 1 and to the supply device with a rotating distributing component 8, as well as a second truncated conical second lower roller 152, mounted loose in rotation around its shaft 153, which is slanted from bottom to top and from outside, form its large base 154 (on the same axial side as the large base 150 of the upper roller 148) to its small base (on the same axial side as the small base 151 of the upper roller 148) and in relation to the hopper 1 and to the supply device (6, 8), so that the two rollers 148 and 152 are externally tangent to one another along a common generatrix 158, which is substantially horizontal, the two shafts 149 and 153 of the rollers being concurrent at a point of the said common generatrix 158. The projection spout delimited between the two rollers 148 and 152 is supplied from the base of the hopper 1 by a slide 156 curved in its downstream part and the downstream edge of which is engaged in the input of the projection spout, and the granular products are projected according to trajectories, such as 157a to 157e, the reach of which decreases progressively from the extremity of the spout delimited by the large bases 150 and 154 of the rollers towards the extremity of the spout delimited by the small bases 151 and 155 of the rollers, in relation to the tangential speed of these rollers which diminishes progressively from the large bases to the small bases.

In the implementations of FIGS. 28 to 33, the means of spreading do not comprise any deflector but are constituted by particular shapes and arrangements of the rollers and/or by means of driving in rotation of the latter, so as to ensure different casting speeds. However, these means can be combined to means of deflection of the different type described above.

We claim:

1. A spreader for granulated products by forced projection, comprising:

a carrying chassis (62', 62') on which is mounted at least one element for the transmission (65', 66') of a movement of rotation which is meant to be coupled to a motor, a hopper (1) mounted on the chassis and destined to contain the load of granular products (2) capable of flowing through at least one opening (3) at the base of the hopper (1), means of raising to speed and of forcibly projecting granular products, which are secured onto the chassis and fed with granular products from at least one opening (3) at the base of the hopper (1), and means (18) for the distribution of the projected granular products, the said means of distribution (18) being also secured on the chassis, and in which the said means of speeding up and of forced projection (10) are arranged in at least one caster group, comprising a first cylindrical roller (11) mounted in rotation on the chassis around its fixed axis (12), and the external lateral surface of which forms a first mobile endless surface delimiting, with a second mobile endless surface, a projection spout having an inlet (15) and an outlet (16) which have a passage section progressively and respectively decreasing and increasing, one at least of the endless surfaces being positively driven from the said transmission element and forming a driving surface, which drives the granular products introduced into the inlet (15) of the projection spout to the outer (16) of the latter so that these products receive, between the two mobile endless surfaces, a linear speed which ensures their projection outside the projection spout, characterized in that the second mobile endless surface is also formed by the outer lateral surface of a second cylindrical roller (13), mounted in rotation on the chassis around its axis (14) and in such a position that the first (11) and the second (13) rollers, one of which at least is coated with a peripheral coating of a deformable elastic material, are substantially externally tangent to one another, so that the granular products are projected out of the projection spout (15,16) in a thin sheet centered on the tangent plane shared by the two rollers (11,13) the axes (12,14) of the rollers are substantially parallel to one another and substantially horizontal;

means of injection of the granular products (2) into the projection spout (64,65) of at least one caster group, the said means of injection comprising an injection spout (62, 63), having an input (62) and an output (63) the sections of passage of which are progressively and respectively decreasing and increasing, and which is situated between the base (6) of the hopper (1) and the projection spout (64,65) of each corresponding caster group, and delimited by the outer lateral surfaces of two cylindrical rollers (55,59) substantially externally tangent to one another and mounted in rotation on the chassis each around its axis (56,60) substantially parallel with the axis (58) of the second roller (57) of each corresponding caster group, one at least of the two rollers (55,59) which delimit the injection spout (62,63) being positively driven in rotation from the said element of transmission, to constitute a driving roller driving away the granular products introduced from the base of the hopper (1) into the input (62) of the injection spout up to the outlet of the latter (63) while transmitting to them a linear speed such that the granular products leave the outlet (63) of the injection spout in a thin sheet centered on the tangent plane shared by the two rollers (55, 59) delimiting the said injection spout, the said means of injection also comprising, for each corresponding caster group, an injection deflector (61) carried by the chassis and which is curved, with the concave face turned towards the first roller (55) and which guides the sheet of granular products leaving the outlet (63) of the injection spout to the inlet (64) of the projection spout.

2. A spreader according to claim 1, characterized in that the tangent plane shared by the two rollers (55, 59) which delimit the injection spout (62, 63) is substantially perpendicular to the tangent plane shared by the first (55) and second (57) rollers delimiting the projection spout (64, 65) of each corresponding caster group.

3. A spreader according to claim 2, characterized in that the first roller (55) delimiting a projection roller (64, 65) fed from an injection spout (62, 63) constitutes simultaneously one of the two rollers (55, 59) delimiting the said injection spout, the other being a third roller (59), and the axis (56) of the first roller (55) being situated above the axis (58) of the second corresponding roller (57), and, preferably, inside the axis (58) of the latter, in relation to the base (6) of the hopper (1).

4. A spreader according to claim 3 characterized in that each caster group comprises its own means of injection, and that the axis (60) of its third roller (59) is situated inside the axis (58) of the second corresponding roller (57), in relation to the base (6) of the hopper (1) and at a level situated between the levels of the axes (56, 58) of the first (55) and second (57) rollers of the corresponding caster group, the roller(s) positively driven in rotation from the said element of transmission comprising, for each caster group, at least one of said first second and third rollers.

5. A spreader according to claim 3, characterized in that the axes (82, 84) of the first and third rollers (81, 83) are substantially situated in the same horizontal plane, so that these rollers delimit an injection spout (91, 92) substantially vertical, and the third roller (83) delimits simultaneously with a fourth cylindrical roller (87), also mounted in rotation on the chassis around its axis (88) substantially parallel to the axes (82, 84, 86) of the first (81), second (85) and third (83) rollers and situated below the said horizontal plane, so that the third and fourth rollers (83, 81) are substantially externally tangent to one another, a second projection spout (95, 96), similar to that (93, 94) delimited between the first and second rollers (81, 85), one at least of the third and fourth rollers (83, 87) being coated with a peripheral coating in an elastically deformable material, and one at least of the third and fourth rollers (83, 87) being positively driven in rotation from the said element of transmission, so that the means of speeding up and of forced projection are arranged in two caster groups which have an injection spout (91, 92) in common which comprise one the first and second rollers (81, 85) and the other the third and fourth rollers (83, 87), and which cooperate each with an associated spreading device (18'), the means of injection comprising also in addition to the shared injection spout (91, 92) and the deflection injector (89) with its concave face turned towards the first roller (81) and which extends only over part of the axial dimension of the injection spout (91, 92), a second curved injection deflector (90) with its concave face turned towards the third roller (83) and carried by the chassis and mounted in a position adjacent to the said deflector of injection (89), between the first and third rollers (81, 83) and under the outlet (92) of the injection spout, along the remaining part of the axial dimension of the latter, so that the sheet of granular products coming out of the injection spout (91, 92) is divided into two portions each of which is guided by a corresponding injection deflector (89, 90), up to the intake (93, 95) of the corresponding projection spout.

6. A spreader according to claim 5, characterized in that the second and fourth rollers (85, 87) and the two injection deflectors (89, 90) have the same axial dimension, which is substantially half of that of the first and third rollers (81, 83) and in that, on the one hand, the second and fourth rollers (85, 87) and, on the other hand, the two injection deflectors (89, 90) are axially offset in relation to one another substantially by the value of their axial dimension, so as to divide the sheet of granular products coming out of the injection spout (91, 92) in two substantially equal portions and to limit to the maximum the overall measurements in the axial direction of the second and fourth rollers (85, 87).

7. A spreader according to claim 1, characterized in that it comprises a single caster group, comprising the first and second rollers (103, 195) the shafts of which (104, 106) are substantially situated in the same horizontal plane and which delimit between them a projection spout (107, 107') substantially vertical with the output (107') directed downwards.

8. A spreader according to claim 1, of the type in which the means of spreading comprise, for said at least one caster group, a spreading deflector (38') which divides the sheet of granular products coming out from the corresponding projection spout into contiguous fractions of sheet which are deviated, in a plane perpendicular to the axes (56, 58) of the first and second rollers (55, 57) delimiting the said projection spout, according to different trajectories presenting angular orientations which vary progressively between two extreme slants in relation to the direction of motion of the granular products at the output of the said projection spout, characterized in that the spreading deflector (38') presents a continuous and curved deflection surface, with its concave face turned towards the shaft (58) of the said second roller (57), and delimited between an upstream edge (42') presenting a practically nil slant over the tangent plane shared between the first and second rollers (55, 57) and substantially contained in the said tangent plane, two lateral edges (40', 41') and a downstream edge (43') defined by a curved cut out between the downstream extemities of the two lateral edges (40, 41'), so that the deviation angle formed, for any point on the said cut out, between the said shared tangent plane and the tangent to the said deflection surface passing through the said point and in the corresponding plane perpendicular to the shafts (56, 58) of the said first and second rollers (55, 57), is an angle which, when the said point is moved from on extremity to the other of the said cut out, varies in a continuous manner between the minimum value, on a lateral edge (40') and a maximum value on the other lateral edge (41') so that the said contiguous fractions of sheet are guided without bursting by the deflecting surface, from its upstream edge (42') to its downstream edge (43'), beyond which they continue freely trajectories which are progressively slanted along the tangents of the deflection surface along its downstream edge, and from one lateral edge to the other of the said deflection surface.

9. A spreader according to claim 8, characterized in that the minimal value of the deviation angle is practically nil and the maximum value is of the order of 135°, so that the spreading width extends from the dropping point of the granular products having followed a practically free trajectory from the output of the projection spout up to the dropping point of the granular products having followed the most deviated trajectory (44'g) and situated under the spreader itself.

10. A spreader according to claim 7, characterized in that the means of spreading comprise two spreading deflectors (108, 109), adjacent to one another in the direction of the shafts (104, 106) of the rollers (103, 105), and presenting each a continuous and curved deflection surface, one of which (108) has its concave face turned towards the shaft (104) of one of the rollers (103) and the other (109) its concave face turned towards the shaft (106) of the other roller (105) and each delimited between an upstream edge (110) presenting a practically nil slant over the tangent plane shared by the rollers (103, 105) and slightly offset in relation to the said tangent plane on the side of the rollers (105, 103) towards the axis of which (106, 104) the deflection surface (108, 109) considered does not present its concave face, two lateral edges (111, 112), one of which at least through which the corresponding deflector (108, 109) is adjacent to the other, is contained in a plane substantially perpendicular to the shafts of the rollers (103, 105), and a downstream edge (113) essentially defined by a curved cut out substantially between the downstream extremities of the two lateral sides (111, 112), so that the tangents to the deflection surface perpendicularly, to the shafts (104, 106) of the rollers (103, 105) and along the said cut out (113) are slanted over the tangent plane shared by the rollers (103, 105), by an angle which varies in a continuous manner between a minimum value, preferably nil, and a maximum value, so that the sheet of granular products coming out of the projection spout (107, 107') is divided into two parts each of which is guided and deviated without bursting by one respectively of the two deflection surfaces (108, 109), from its upstream edge (110) to its downstream edge (113), beyond which the granular products form contiguous fractions of parts of the sheet which pursue freely progressively slanted trajectories (114a to 114g, 115a to 115g) over the vertical from a lateral edge (111) to the other (112) of each deflection surface (108, 109) and on either side of the tangent plane shared by the two rollers (103, 105).

11. A spreader according to claim 1, characterized in that the means of spreading comprise, for at least one caster group, a deflector (18) for splaying the projected sheet of granular products into a non vertical plane substantially parallel to the shafts (12, 14) of the rollers (11, 13) delimiting the corresponding projection spout (15, 16) the said deflector (18) presenting a cluster of deflection surfaces (21a to 21g), which are spaced one from the other substantially in the direction of the shafts (12, 14) of the rollers, substantially perpendicular to a plane parallel to the said shafts, and each curved between its upstream edge and its downstream edge, by presenting their concave face in one of the two directions of the said shafts, so that the planes tangent to the said deflection surfaces (21a to 21g) along their downstream edge are inclined over to said shafts (12, 14) by an angle which varies progressively between a minimum value and a maximum value, from one extremity to the other of the cluster, in order that the said deflection surfaces delimit between them curved and adjacent passages, each presenting an input and an output between the said edges respectively upstream and downstream of the two neighbouring deflection surfaces which delimit it, the said upstream edges of the said deflection surface (21a to 21f) dividing the said projected sheet into contiguous fractions of sheet each of which is deviated, into one of the said passages which guide it down to its exit, beyond which it follows freely a trajectory substantially in the plane tangent to the deflection surface which has deviated it and at the level of the downstream edge of the said deflection surface.

12. A spreader according to claim 11, characterized in that the said maximum value is 90°, and the said minimal value is such that the corresponding trajectory brings the fraction of sheet (22a) which follows the trajectory back towards the vertical plane P passing through the base of the hopper (1) supplying the corresponding caster group.

13. A spreader according to claim 11, characterized in that each deflection surface (21'c to 21'e) presents an upstream plane part (26c to 26e), slightly slanted over the direction of the flow (F1) of the sheet projected at the inlet of the said passages, preferably of an angle ($\gamma$) lower than 10°, and sufficiently long for the whole fraction of sheet moving along the said direction of the flow and guided by the said deflection surface (21'c to 21'e) to meet the said upstream part (26c to 26e) of the latter before being deviated by a curved part (27c to 27e) of this deflection surface, so that the said fraction of sheet is placed in contact with the said deflection surface practically without rebound of the granular products on this surface.

14. A spreader according to claim 11, characterized in that each deflection surface (21'c to 21'e) presents a plane downstream part (28c to 28e), following a curved part (27c to 27e), and determining the orientation of the trajectory of the corresponding fraction of sheet beyond the corresponding downstream edge (29c to 29e).

15. A spreader according to claim 11, characterized in that each curved passage is delimited by a channel having a bottom (19), lateral opposite walls (21a to 21f), one of which is convex and the other one is concave and defines the deflection surface corresponding to the said passage, each channel being preferably closed by an upper wall (20), facing the bottom (19).

16. A spreader according to claim 15, characterized in that the bottoms of the channels are constituted by a single base plate (19), the lateral walls of the channels are defined by the opposite faces of curved partitions (21a to 21f) secured on the base plate (19) perpendicular to the latter, and the eventual upper walls of the channels are formed by a single cover plate (20), so that the splaying deflector (18) presents the appearance of a flat box the internal volume of which is subdivided by partitions (21a, 21f) into curved adjacent channels of passage.

17. A spreader according to claim 11, characterized in that all the deflection surfaces (21a to 21f) of the same spraying deflector (18) present their concave face turned towards the same side.

18. A spreader according to claim 11, characterized in that the deflection surfaces (128a to 128i) of the same splaying deflector (125) form a cluster substantially fan shaped.

19. A spreader according to claim 11, characterized in that the spreading means comprise, for at least one casting group, a cluster (50) of spreading tubes (50a to 50f) having different lengths, the upstream end parts of which (51) are adjacent to one another, present their axes substantially in the average plane of the projected sheet of granular products, and in parallel to the direction of motion of the said projected sheet, and divide the latter into contiguous fractions of sheet which are guided by one of tubes down to its downstream extremity, substantially offset in the direction of motion of the said projected sheet, in relation to the downstream extremities of the other tubes.

20. A spreader according to claim 19 characterized in that the downstream extremity of one at least of the tubes (50a to 50f) is equipped with a deflector (52).

21. A spreader according to claim 19, characterized in that the downstream extremity of one at least of the tubes (50a to 50f) is fitted with a bursting device (53), towards which is directed the fraction of sheet guided in the corresponding tube (50a to 50f) and on which the granular products of this fraction of sheet rebound before falling back onto the ground.

22. A spreader according to one of the claims 19 to 21, characterized in that the downstream extremity (101) of at least one of the tubes (100a to 100e) is fitted with a supple conduit (102) directed towards the ground and allowing spreading along a localised line.

23. A spreader according to claim 19, characterized in that the downstream extremity of at least one spreading tube is fitted with a dividing end piece, dividing the fraction of sheet guided into the corresponding tube into two parts each of which is pread on one of two areas on the ground which are offset one is relation to the other in the direction of motion of the projected sheet.

24. A spreader according to claim 19, characterized in that one at least of the tubes of the cluster (50) is curved on at least part of its length (50f) so as to bring its downstream extremity closer to a vertical plane (P) passing substantially through the base of the hopper (1) of the spreader.

25. A spreader according to claim 8, characterized in that the said spreading means (38') are, at least for one caster group, mounted pivoting on the chassis around at least one shaft (58') substantially parallel to the shafts (56, 58) of the rollers (55, 57) delimiting the corresponding projection spout in order to allow the adjustment of the spreading means (38') and accordingly the adjustment of the spreading width.

26. A spreader according to claim 1, characterized in that the supply of at least one caster group with granular products from the hopper (1) is ensured by dosing means (8) making fall by gravity, between two rollers (55, 59) of the said caster group, a sheet of granular products the average plane of which, according to its thickness, is substantially merged with the tangent plane shared by the two rollers (55, 59).

27. A spreader according to claim 26, characterized in that the said dosing means comprise a volumetric distribution device comprising at least one rotating component (8) driven in rotation in a trough (6) fed in granular products through an opening (3) at the base of the hopper (1).

28. A spreader according to claim 1, characterized in that the supply of at least one caster group with granular products from the hopper (1) is assured by dosing means comprising a mobile gate (39) adjustable in position with respect to an edge of an opening defined at the base of the hopper (1) between the said edge and a part of the outer lateral surface of a roller (33) of at least one corresponding caster group which protrudes partially into the base of the hopper (1) and ensures by its rotation the direct drive of the granular products towards the corresponding caster group or groups.

29. A spreader according to claim 26, characterized in that its dosing means are shared between the two caster groups of the spreader.

30. A spreader according to claim 1, characterized in that it comprises several adjacent caster groups, the first rollers of which (130a to 130d) have the same radius, and are set side by side and coaxial and the second rollers of which (131a to 131d) also have the same radius and are set side by side and coaxial, the rollers (130a to 130d) of one of the two sets of adjacent rollers thus defined being driving rollers driven in rotation at different speeds one from the other while the rollers (131a to 131d) of the other set are each mounted loose in rotation around its axis and driven each by contact and friction from the corresponding driving roller (130a to 130d), the spreading means of the granular products comprising means (134, 136, 138, 139, 140) of driving in rotation driving rollers at the said different speeds.

31. A spreader according to claim 30, characterized in that each of the adjacent caster groups comprises an injection spout delimited between its first roller (130a to 130d) and a third roller (132a) of a set of rollers of the same radius, set side by side and coaxial and each mounted loose in rotation around its shaft.

32. A spreader according to claim 30, characterized in that the said driving means in rotation of the driving rollers (130a to 130d) comprise a set of tiered return pulleys (139a to 139d), of a diameter different from one to the other, independent of one another and each integral in rotation with one of the shafts (140a to 140d) of a set of tubular coaxial transmission shafts, each of which is integral in rotation respectively with one of the driving rollers (130a to 130d), as well as a tiered driving pulley (136) integral in rotation with a driving shaft (134) and linked to each of the return pulleys (139a to 139d) by a driving belt (138a to 138d).

33. A spreader according to claim 1, characterized in that it comprises several adjacent caster groups, the first rollers of which (142a to 142d) are coaxial set side by side, driven in rotation around their shaft (143) at the same angular speed, and have radii different from one roller to another, so as to form a first set of adjacent tiered rollers (142a to 142d), the second roller (147a to 147d) of the caster groups also being coaxial, set side by side and having different radii from one second roller to the other, but being mounted loose in rotation around their shaft 145, so as to form a second set of tiered rollers (144a to 144d) which cooperate with the first set of tiered rollers so that the sum of the radii of the first and second rollers of the same caster group is constant from one caster group to the other, in order that the distribution of the granular product is ensured by the different peripheral speeds to the rollers from one group of rollers to the other.

34. A spreader according to claim 1, characterized in that the first and second rollers (148, 152) of at least one caster group are rollers of a truncated conical shape one of which (148) is driven in rotation around its shaft (149) and which are externally tangent to one another along a common generatrix (158), preferably substantially horizontal, the shafts (149, 153) of the rollers being concurrent and the small bases (151, 155) of the rollers being arranged on the same axial side, in order that the distribution of the granular products is ensured by the variation in the tangential speed of the rollers (148, 152), from one extremity to the other of the common generatrix (158), and therefore of the projection spout.

35. A spreader according to claim 1, characterized in that it comprises moreover two lateral flaps (68, 69) limiting between them the flow of the sheet of granular products supplying at least one caster group from the hopper (1), and at least on mask (70) which, as well as one at least of the lateral flaps, is mobile and adjustable in a substantially transverse direction in regard to the flow of the said sheet in order to define its width and/or its position in relation to the rollers (55, 57, 59) of the corresponding caster group or groups.

36. A spreader according to claim 1, characterized in that one at least of its caster groups is such that the shafts (12, 14) of its rollers (11, 13) are substantially parallel to the direction of motion of the spreader.

37. A spreader according to claim 1, characterized in that one at least of its caster groups is such that the shafts (122, 124) of its rollers (120, 121) are slanted over the direction of motion of the spreader, and in particular substantially perpendicular to the said direction of motion.

38. A spreader according to claim 1, characterized in that it comprises, for at least one caster group, means of variation and/or of adjustment of the speed of rotation of at least one roller.

* * * * *